US009215452B2

(12) United States Patent
Watanabe

(10) Patent No.: US 9,215,452 B2
(45) Date of Patent: Dec. 15, 2015

(54) STEREOSCOPIC VIDEO DISPLAY APPARATUS AND STEREOSCOPIC VIDEO DISPLAY METHOD

(75) Inventor: Tatsumi Watanabe, Osaka (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 881 days.

(21) Appl. No.: 13/284,038

(22) Filed: Oct. 28, 2011

(65) Prior Publication Data

US 2012/0044330 A1 Feb. 23, 2012

Related U.S. Application Data

(63) Continuation of application No. PCT/JP2011/002327, filed on Apr. 21, 2011.

(30) Foreign Application Priority Data

Apr. 21, 2010 (JP) ................................. 2010-098310

(51) Int. Cl.
*H04N 13/00* (2006.01)
*H04N 15/00* (2006.01)
(Continued)

(52) U.S. Cl.
CPC .......... *H04N 13/0447* (2013.01); *G02B 27/225* (2013.01); *G02B 27/2214* (2013.01); *H04N 13/0413* (2013.01); *H04N 13/0477* (2013.01)

(58) Field of Classification Search
CPC ............. G02B 27/2214; G02B 27/225; H04N 13/0413; H04N 13/0447
USPC .......................................................... 348/54
See application file for complete search history.

(56) References Cited

U.S. PATENT DOCUMENTS

| 5,734,455 A | 3/1998 | Yoshida et al. |
|---|---|---|
| 2003/0048354 A1 | 3/2003 | Takemoto et al. |

(Continued)

FOREIGN PATENT DOCUMENTS

| EP | 1 102 106 A2 | 5/2001 |
|---|---|---|
| JP | 7-311389 | 11/1995 |

(Continued)

OTHER PUBLICATIONS

International Search Report issued Aug. 2, 2011 in International Application No. PCT/JP2011/002327.

(Continued)

*Primary Examiner* — Jessica M Prince
(74) *Attorney, Agent, or Firm* — Wenderoth, Lind & Ponack, L.L.P.

(57) ABSTRACT

A stereoscopic video display apparatus includes: a two-dimensional display unit which selects, for each of parallax images having a parallax from a reference parallax image, at least one pixel sequence on a panel, and displays each of the parallax images using the selected pixel sequence; a barrier part which divides light from the pixel sequences such that the respective parallax images are displayed at predetermined positions; a position detecting unit which detects the positions of viewers; and a parallax image arrangement control unit which specifies viewing positions possible for the left eyes of the viewers from among the detected viewing positions other than the viewing positions for the right eyes, and cause the two-dimensional display unit to respectively display the parallax images predetermined for the left eyes at the specified positions.

11 Claims, 27 Drawing Sheets

(51) Int. Cl.
*A61B 1/04* (2006.01)
*H04N 13/02* (2006.01)
*H04N 13/04* (2006.01)
*G02B 27/22* (2006.01)

(56) References Cited

U.S. PATENT DOCUMENTS

| | | | |
|---|---|---|---|
| 2004/0150583 A1 | 8/2004 | Fukushima et al. | |
| 2006/0170674 A1* | 8/2006 | Tsubaki et al. | 345/419 |
| 2007/0266412 A1* | 11/2007 | Trowbridge et al. | 725/90 |
| 2008/0309663 A1 | 12/2008 | Fukushima et al. | |
| 2009/0174658 A1* | 7/2009 | Blatchley et al. | 345/158 |
| 2009/0282429 A1* | 11/2009 | Olsson et al. | 725/10 |
| 2011/0157339 A1* | 6/2011 | Bennett et al. | 348/59 |
| 2011/0157697 A1* | 6/2011 | Bennett et al. | 359/462 |
| 2011/0164188 A1* | 7/2011 | Karaoguz et al. | 348/734 |

FOREIGN PATENT DOCUMENTS

| | | |
|---|---|---|
| JP | 3030243 | 2/2000 |
| JP | 2003-169351 | 6/2003 |
| JP | 2004-212666 | 7/2004 |
| JP | 2005-91447 | 4/2005 |
| WO | 2009/136235 | 11/2009 |

OTHER PUBLICATIONS

Yue Bao et al., "Multi-observers tracking autostereoscopic display using parallax barrier", Journal of the Institute of Image Electronics Engineers of Japan, vol. 32, Issue No. 5, 2003, pp. 667-673 (with partial English translation).

Extended European Search Report issued Oct. 14, 2014 in corresponding European Application No. 11770989.9.

P. Surman et al., "A Roadmap for Autostereoscopic Multi-Viewer Domestic TV Displays", Proceedings / 2006 IEEE International Conference on Multimedia and Expo, ICME 2006: Jul. 9-12, 2006, Hilton, Toronto, Ontario, Canada, IEEE Service Center, Piscataway, NJ, Jul. 1, 2006, pp. 1693-1696, XP031033180, DOI: 10.1109/ICME.2006.262875, ISBN: 978-1-4244-0366-0.

Neil A. Dodgson, "On the number of viewing zones required for head-tracked autostereoscopic display", Proc. SPIE 6055, Stereoscopic Displays and Virtual Reality Systems XIII, 60550Q, Jan. 27, 2006, XP055076972, DOI: 10.1117/12.641390, Retrieved from the Internet: URL:http://proceedings.spiedigitallibrary.org/data/Conferences/SPIEP/1864/60550Q_1.pdf.

* cited by examiner

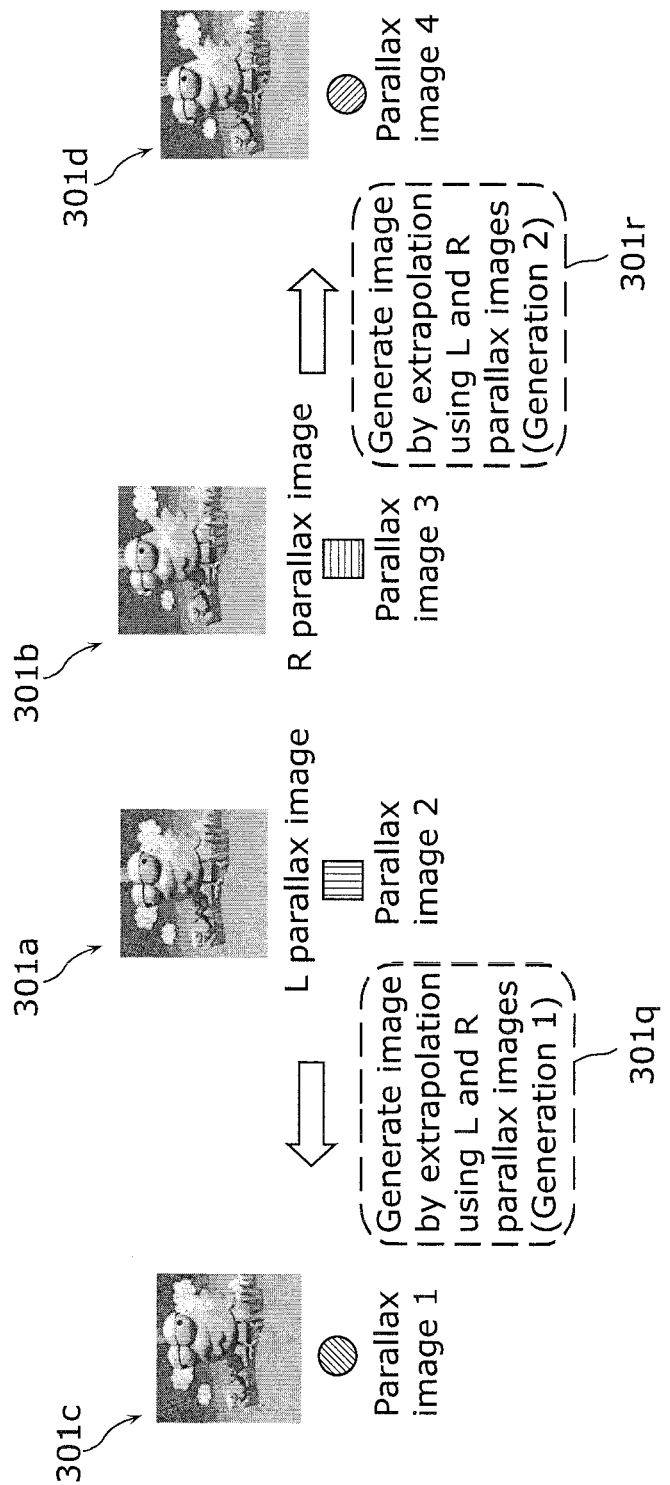

FIG. 23B  PRIOR ART

| States of viewers | Parallax images | | | Viewer 1 | | Viewer 2 | |
|---|---|---|---|---|---|---|---|
| | a | b | c | Left eye | Right eye | Left eye | Right eye |
| Both viewers are in static state | i | ii | iii | ii | iii | i | ii |
| Viewer 1 makes rightward movement | ii | iii | i | i | ii | ii | iii |
| Viewer 2 makes leftward movement | iii | i | ii | i | ii | ii | iii |

STEREOSCOPIC VIDEO DISPLAY APPARATUS AND STEREOSCOPIC VIDEO DISPLAY METHOD

CROSS REFERENCE TO RELATED APPLICATIONS

This is a continuation application of PCT Patent Application No. PCT/JP2011/002327 filed on Apr. 21, 2011, designating the United States of America, which is based on and claims priority of Japanese Patent Application No. 2010-098310 filed on Apr. 21, 2010. The entire disclosures of the above-identified applications, including the specifications, drawings and claims are incorporated herein by reference in their entirety.

BACKGROUND OF THE INVENTION (1) Field of the Invention

The present invention relates to a stereoscopic video display apparatus which enables viewers to view a stereoscopic video without wearing any special glasses.

(2) Description of the Related Art

Apparatuses configured to include parallax barriers or lenticular lenses (spectroscopes) arranged facing viewers of a display apparatus such as a liquid crystal panel, a PDP, and the like have been conventionally known as apparatuses which display stereoscopic videos without requiring the viewers to wear special glasses. Such an apparatus including such spectroscopes displays a stereoscopic video by horizontally dividing light from a left-eye image and a right-eye image displayed on a display panel.

FIG. 21 is a diagram illustrating the principle of a stereoscopic video display apparatus 91a using a parallax barrier 92 and not requiring any glasses.

In the diagram, 91 denotes a video display panel, and 92 denotes a parallax barrier part.

The video display panel 91 is made up of left-eye pixel sequences and right-eye pixel sequences arranged alternately in the vertical direction (the direction z shown) in the sheet of FIG. 21. Each of the left-eye pixel sequences is made up of left-eye pixels L, and each of the right-eye pixel sequences is made up of right-eye pixels R.

The parallax barrier 92 is formed to include slit-shaped openings 92a and light-shielding portions 92b arranged alternately and extend in the vertical direction.

It is to be noted that a left-eye video 93L made up of the left-eye pixels L and a right-eye video 93R made up of the right-eye pixels R includes binocular parallaxes which enable viewers to perceive these videos as if they are a single stereoscopic video.

A viewer 94 who wish to watch a stereoscopic video sets his/her head at a predetermined position 94Px (normal position). By doing so, a left-eye video 93L enters a left eye 94L via one of the openings 92a, and a right-eye video 93R enters a right eye 94R via another one of the openings 92a. Thereby, the viewer 94 can recognize these videos as a stereoscopic video.

At this time, the light of the right-eye video 93R is shielded by one of the light shielding portions 92b and does not enter the left eye 94L, and the light of the left-eye video 93L is shielded by another one of the light shielding portions 92b and does not enter the right eye 94R.

However, such a conventional stereoscopic video display apparatus 91a requires the viewer 94 to set the head position 94P of his/her head at the predetermined position 94Px. In other words, if the head position 94P is deviated from the predetermined position 94Px, the light of the right-eye video 93R enters the left eye 94L and the light of the left-eye video 93L enters the right eye 94R. This produces a problem (pseudo stereoscopy) of disabling the viewer 94 to perceive an excellent stereoscopic video.

For this reason, in order to watch an excellent stereoscopic video, the viewer 94 needs to find out the normal position 94Px which enables generation of such stereoscopic video and fix the head position 94P at the normal position 94Px.

In addition, if the head position is deviated from the normal position 94Px while the viewer is watching the stereoscopic video, the head position 94P needs to be moved to and set at the normal position 94Px.

A technique (Patent Reference 1: Japanese Patent Publication No. 3030243) has been conceived to improve the aforementioned technique. In the case where a head position 94P is at a position deviated from such a normal position 94Px which yields actual stereoscopy, the technique switches a left-eye image 93L and a right-eye image 93R depending on the current head position 94P, and thereby enables a viewer to watch a normal video at the current head position 94P deviated from the normal position 94Px. However, this method is applicable only in the case where the number of viewers is one.

The problem of pseudo stereoscopy which is produced depending on a head position arises not only when a pair of a left-eye parallax image and a right-eye parallax image is displayed, but also when three or more parallax images are displayed.

FIG. 22 is a diagram showing an example of displaying sets of four parallax images.

Images A, B, C, and D (parallax images 99a to 99d) correspond to the displayed parallax images.

The positions 9L (positions 9La, 9Lb, . . . ) denote the positions of viewers. The positions 9La, 9Lb, 9Lc, and 9Ld show the positions at which the parallax images A, B, C, and D can be viewed, respectively.

As shown in this diagram, the sets of parallax images 99a to 99d are sequentially displayed on a parallel surface 9LL parallel to a video display panel 1 at predetermined position intervals.

Thus, if a left eye 94L is currently positioned at a position (position 9Ld) which enables viewing of a parallax image 99d depending on a movement of the head position 94P (FIG. 21), the parallax image 99d enters the left eye 94L.

In this case, a right eye 94R is currently positioned at a position (position 9La: for example, the fifth position when counted from the leftmost position among the shown positions) which enables viewing of a parallax image 99a, and thus the parallax image 99a enters the right eye 94R.

In this way, pseudo stereoscopy is produced.

Furthermore, a crosstalk is also produced if the left eye 94L is in the middle of the position 9La and the position 9Lb and the right eye 94R is in the middle of the position 9Lb and the position 9Lc.

The use of the technique using plural sets of parallax images shown in FIG. 22 enables viewing by plural viewers. The following description is given of a case where the left eye 94L and the right eye 94R of one of the two viewers 94 are positioned at the position 9La and the position 9Lb, respectively. At this time, the left eye 94L and the right eye 94R of the other viewer 94 are positioned at the position 9Lc and the position 9Ld, respectively. This enables simultaneous viewing by both the viewers 94.

As mentioned earlier, pseudo stereoscopy is produced when such a technique is used. One of such techniques which reduce pseudo stereoscopy caused in the technique shown in FIG. 23A is an approach disclosed in Non-patent Reference 1 ("Multi-Observers Tracking Autostereoscopic Display Using Parallax Barrier (which is a translation of the title of a Japanese Paper)", Bao Yue, The Journal of the Institute of Image Electronics Engineers of Japan, Vol. 32, No. 5, pp. 667 to 673, (2003)).

FIG. 23A is a diagram showing a conventional image display scheme (shown in Non-patent Reference 1) using sets of three parallax images (images a to c) for two viewers.

As shown in the diagram, the technique of Non-patent Reference 1 uses each of opening portions 1 in a parallax barrier part for each of the sets of three parallax images. Furthermore, Non-patent Reference 1 discloses a scheme which performs tracking of two viewers (viewer 9b1 and viewer 9b2) and thereby enables the two viewers to watch a stereoscopic video without causing pseudo stereoscopy.

FIG. 23B is a diagram showing a table of operations in the scheme in Non-patent Reference 1.

The scheme of Non-patent Reference 1 uses only sets of three parallax images (i, ii, and iii in FIG. 23B) as sets of three parallax images to be displayed at parallax image display positions (a, b, and c in FIG. 23A) to be displayed.

The following description is given of a case where the two viewers 94 (viewers 9b1 and 9b2) are in static states (see the first case "Both viewers are in static states" in line 2 in the table of FIG. 23B).

In this case, a parallax image ii and a parallax image iii are displayed for (enter) the left eye and the right eye of the viewer 1 (viewer 9b1) (see column 5 and 6 of the first case in FIG. 23B). In this case, a parallax image i and a parallax image ii are displayed for the left eye and the right eye of the viewer 2 (see column 7 and 8 of the first case in FIG. 23B).

In this way, images (parallax images) which enter corresponding ones of the eyes of the viewers are watched (the images are displayed at positions corresponding to the eyes and thus are perceived by the viewers).

Here, the viewpoint positions of the respective images (parallax images i, ii, and iii) are, for example, the positions of imaging apparatuses at the time when the imaging apparatuses captured the images.

For example, a stereoscopic video is appropriately perceived by a viewer 94 when the viewpoint position of the image perceived through the left eye 94L is at the left side of the viewpoint position of the image perceived through the right eye 94R.

In the case of the first case in the table of FIG. 23B, the positions of the left eye 94L and the right eye 94R of the first viewer 9b1 are the positions b and c in FIG. 23B. In this case, the positions of the left eye 94L and the right eye 94R of the second viewer 9b2 are the positions a and b in FIG. 23B.

In this case, images i, ii, and iii are displayed at the respective positions a, b, and c as shown in the above case.

In other words, the image i displayed at the position a is an image at a viewpoint position at the left side of the viewpoint of the image ii displayed at the position b. In other words, the image ii displayed at the position b is an image at a viewpoint position at the left side of the viewpoint of the image iii displayed at the position c.

When three parallax images (a, b, and c) are arranged in this way in the first case of the table of FIG. 23B, the viewpoint positions of the images perceived through left eyes 94L of the respective viewers are located at the left sides of the viewpoint positions of the images perceived through left eyes 94L of the respective viewers. Therefore, both of the first and second viewers 9b1 and 9b2 can appropriately perceive a stereoscopic video, in other words, can enjoy stereoscopic viewing.

Next, a description is given of a second case (in the table of FIG. 23B) where the first viewer 9b1 moves to the right (see a motion 9b1m in FIG. 23A) without being tracked. As shown in the first case in table of FIG. 23B, the first viewer 9b1 perceives the parallax image iii using the left eye 94L and the parallax image i using the right eye 94R when images are displayed (see the earlier description). In this case, the right and left images are perceived opposite by the first viewer 9b1 due to pseudo stereoscopy.

To prevent this, the images are displayed such that the first viewer 9b1 can perceive the parallax images i and ii using the left eye 94L and the right eye 94R respectively, and the second viewer 9b2 can perceive the parallax images ii and iii using the left eye 94L and the right eye 94R respectively.

In this way, even in the second case after the movement 9b1m in FIG. 23A is made, both of the two viewers can enjoy stereoscopic viewing.

Next, a description is given of a third case where the viewer 2 moves to the left (as shown in a movement 9b2m in FIG. 23A and see the table of FIG. 23B). It is possible to prevent occurrence of pseudo stereoscopy also in this case in a manner similar to the aforementioned manner.

In this case, the parallax images to be displayed are rearranged such that the first viewer 9b1 can perceive the parallax images i and ii through the left eye 94L and the right eye 94R respectively, and the second viewer 9b2 can perceive the parallax images ii and iii through the left eye 94L and the right eye 94R respectively.

In this way, even in the third case after the movement 9b2m in FIG. 23A is made, both of the two viewers can enjoy stereoscopic viewing.

SUMMARY OF THE INVENTION

The technique of Patent Reference 1 is not applicable to a case of plural viewers.

Non-patent Reference 1 (see FIG. 22) is applicable to a case of two viewers. However, in the case of three or more viewers, it is highly likely that one or some of the viewers suffer(s) from pseudo stereoscopy.

The present invention has been conceived in view of this with an aim to provide a stereoscopic video display apparatus which (i) prevents occurrence of pseudo stereoscopy in a more reliable manner and (ii) displays a high-quality stereoscopic video in a more reliable manner.

In order to solve the aforementioned problem, a stereoscopic video display apparatus according to the present invention is a stereoscopic video display apparatus which displays a set of parallax images captured at multiple viewpoints and having a parallax from a reference parallax image and thereby enables a plurality of viewers to simultaneously watch a stereoscopic video generated from the set of parallax images without wearing any special glasses. The stereoscopic video display apparatus includes: a two-dimensional display unit configured to select, for each of the parallax images, at least one pixel sequence from pixel sequences of the parallax image, and display each of the parallax images using the at least one pixel sequence; a dividing unit configured to divide light from the pixel sequences for the respective parallax images such that the respective parallax images are displayed at predetermined display positions; a position detecting unit configured to detect the position of each of the viewers watching the stereoscopic video; and a parallax image arrangement control unit configured to (i) control display of the respective parallax images according to the detected positions, (ii) specify, for each of the viewers at the detected positions, a viewing position from among the viewing positions other than a viewing position for a predetermined one of the right eye and the left eye of the viewer, and (iii) cause the two-dimensional display unit to display the parallax image for the eye other than the predetermined eye at the specified display position. Here, the special glasses are glasses used to perceive a stereoscopic video and thus are not normal glasses such as glasses for elderly people. For example, the predetermined one of the eyes is the right eye, a viewing position among the positions other than the viewing position for the predetermined eye is a position 1134 in FIG. 3, and the parallax image determined for the eye is, in FIG. 3, a parallax image 1101 associated with the leftmost viewing position among the viewing positions shown therein).

The stereoscopic video display apparatus may be a stereoscopic video display apparatus which enables n number of viewers (even in the case of three or more viewers) to watch a stereoscopic video without causing pseudo stereoscopy, by controlling the display positions of n+1 number of parallax images on a display panel depending on the detected positions of the heads of the viewers.

The stereoscopic video display apparatus may divide the position intervals between the predetermined display positions of the parallax images in the sets such that the position intervals are smaller than the inter-eye distances of the respective viewers. The stereoscopic video display apparatus may control the display positions of a number (obtained according to n×m+1) of parallax images according to the number of position interval segments m on the display panel depending on the detected head positions. This enables three or more viewers to watch a stereoscopic video without causing pseudo stereoscopy, and enables reduction in the area size of crosstalk which is produced between the predetermined positions.

Furthermore, the stereoscopic video display apparatus may prepare only a set of a left-eye image L and a right-eye image R, and depending on the number of viewers (for example, three or more viewers), perform interpolation using the L and R parallax image set to generate and use interpolated parallax images without preparing other parallax images required depending on the number of viewers. This enables the three or more viewers to watch the stereoscopic video without causing pseudo stereoscopy.

The present invention provides such a stereoscopic video display apparatus which enables viewers to watch a stereoscopic video without causing pseudo stereoscopy even when the three or more viewers watch the stereoscopic video at the same time. The present invention requires only simple processes such as identifying, for each of current viewers at detected positions, a position (a position 1134) at which a predetermined one (for example, a right eye) of a right eye and a left eye of any one of the current viewers is not positioned even after a change is made in the number of the viewers. Furthermore, the present invention does not require any complex structure (see the table of FIG. 23B), and thus uses a simple structure.

Furthermore, the present invention makes it possible to suppress occurrence of pseudo stereoscopy and the size of crosstalk area by combining (i) division of each of position interval(s) between the parallax images in each set such that the position interval is smaller than the inter-eye distance and (ii) parallax image display control based on the head positions.

Furthermore, the present invention provides an advantageous effect of eliminating the need to prepare additional sets of parallax images required with respect to the maximum number of viewers, by combining interpolation using the set of a left-eye image L and a right-eye image R to generate interpolated parallax images.

BRIEF DESCRIPTION OF THE DRAWINGS

These and other objects, advantages and features of the invention will become apparent from the following description thereof taken in conjunction with the accompanying drawings that illustrate a specific embodiment of the present invention. In the Drawings:

FIG. 16A is a diagram showing a parallax image generation procedure taken by the stereoscopic video display apparatus according to Embodiment 3 of the present invention;

FIG. 23B is a diagram showing a table of operations in the scheme in FIG. 23A.

DESCRIPTION OF THE PREFERRED EMBODIMENTS

Figure 1:
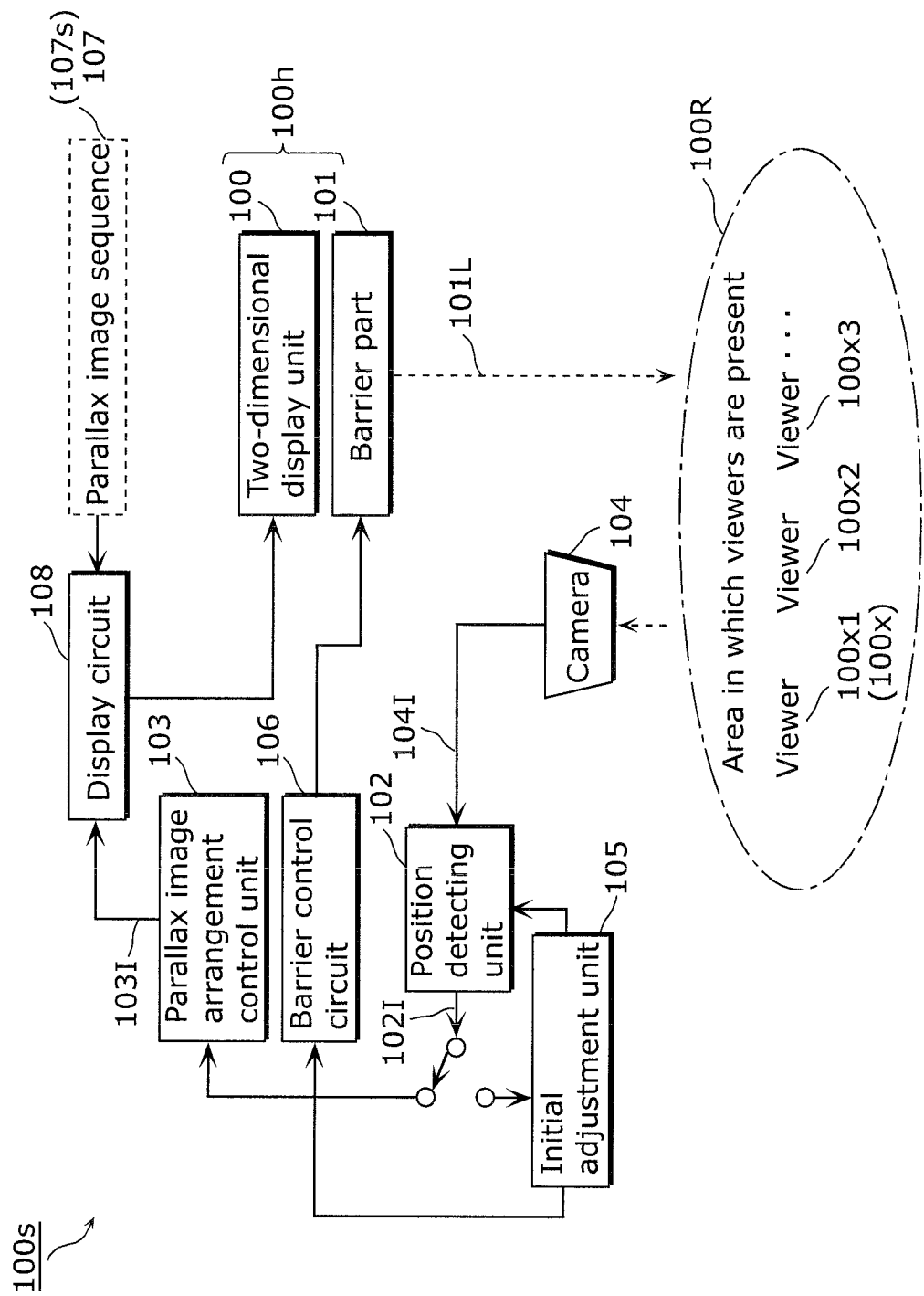
FIG. 1 is a diagram showing a structure of a stereoscopic video display apparatus according to Embodiment 1 of the present invention.

Hereinafter, Embodiments 1 to 3 as preferred embodiments of the present invention will be described with reference to the drawings.

A stereoscopic video display apparatus according to this embodiment is a stereoscopic video display apparatus 100s (in FIG. 1 etc.) which displays a set of parallax images (for example, images 1101 to 1105 in FIG. 3) captured at multiple viewpoints (multiple viewing positions) and having a parallax from a reference parallax image and thereby enables a plurality of viewers (viewers 114a to 114d) to simultaneously watch a stereoscopic video generated from the set of parallax images without wearing any special glasses. The stereoscopic video display apparatus includes: a two-dimensional display unit 100 configured to select, for each of the parallax images (for example, an image 1103 in FIG. 3), at least one pixel sequence (for example, a pixel sequence a) from pixel sequences (for example, pixel sequences a to d) of the parallax image, and display the selected parallax image (for example, the image 1103) using the at least one pixel sequence; a dividing unit (a barrier part) 101 configured to divide light (light 101L) composed of light from the respective parallax images (images 1101 to 1105) into light (for example, light 101Lp in FIG. 2) for a corresponding parallax image such that each of the parallax images is displayed at a predetermined display position (for example, a position 1136); a position detecting unit 102 configured to detect the position of each of the viewers (114) watching the stereoscopic video; and a parallax image arrangement control unit 103 configured to (i) control display of the respective parallax images according to the detected positions, (ii) specify, for each of the viewers (viewers 114a, 114b, ...) at the detected positions, a viewing position from among the viewing positions other than a viewing position (for example, a position 1134) for a predetermined one (for example, a right eye) of the right eye and the left eye of the viewer, and (iii) cause the two-dimensional display unit to display the parallax image (for example, the image 1101 associated with the leftmost viewing position) for the eye other than the predetermined eye at the specified display position.

Embodiment 1 describes a method of displaying a stereoscopic video by controlling the display positions of parallax images on a display panel based on the detected head positions of viewers by using parallax images whose number is obtained according to the number of viewers+1.

In Embodiment 2, each of predetermined position intervals between the positions of the parallax images are divided into position interval segments each shorter than a corresponding one of inter-eye distances. Embodiment 2 describes a method of displaying a stereoscopic video by controlling the display positions of the parallax images on a display panel based on the detected head positions of viewers by using parallax images whose number is obtained according to the number of viewers×m+1 wherein m denotes the number of position interval segments.

Embodiment 3 describes a method of displaying a stereoscopic video by introducing, to one of Embodiment 1 and Embodiment 2, a method of preparing only a set of a left-eye image L and a right-eye image R, and performing interpolation using the set of a left-eye image L and a right-eye image R to generate parallax images whose number is determined according to the number of viewers.

Embodiment 1

With reference to FIG. 1 to FIG. 8, Embodiment 1 describes an apparatus which displays a stereoscopic video by controlling, using plural parallax images whose number is obtained according to the number of viewers+1, the display positions of parallax images on a display panel based on the detected head positions of the viewers of the parallax images.

Figure 2:
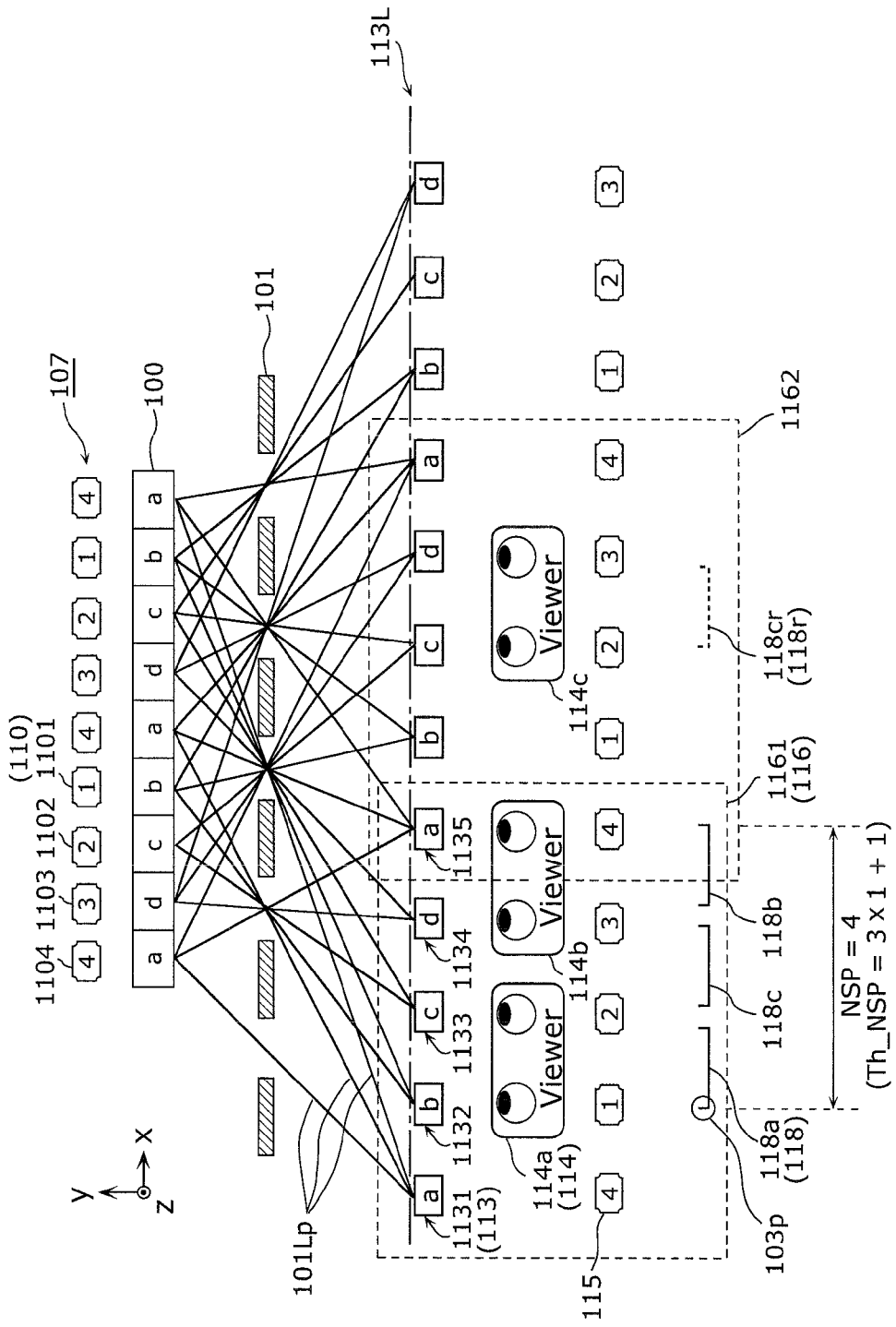
FIG. 2 is a diagram schematically showing processing performed by a parallax image arrangement control unit of the stereoscopic video display apparatus according to Embodiment 1 of the present invention (in the case of three viewers)
Figure 3:
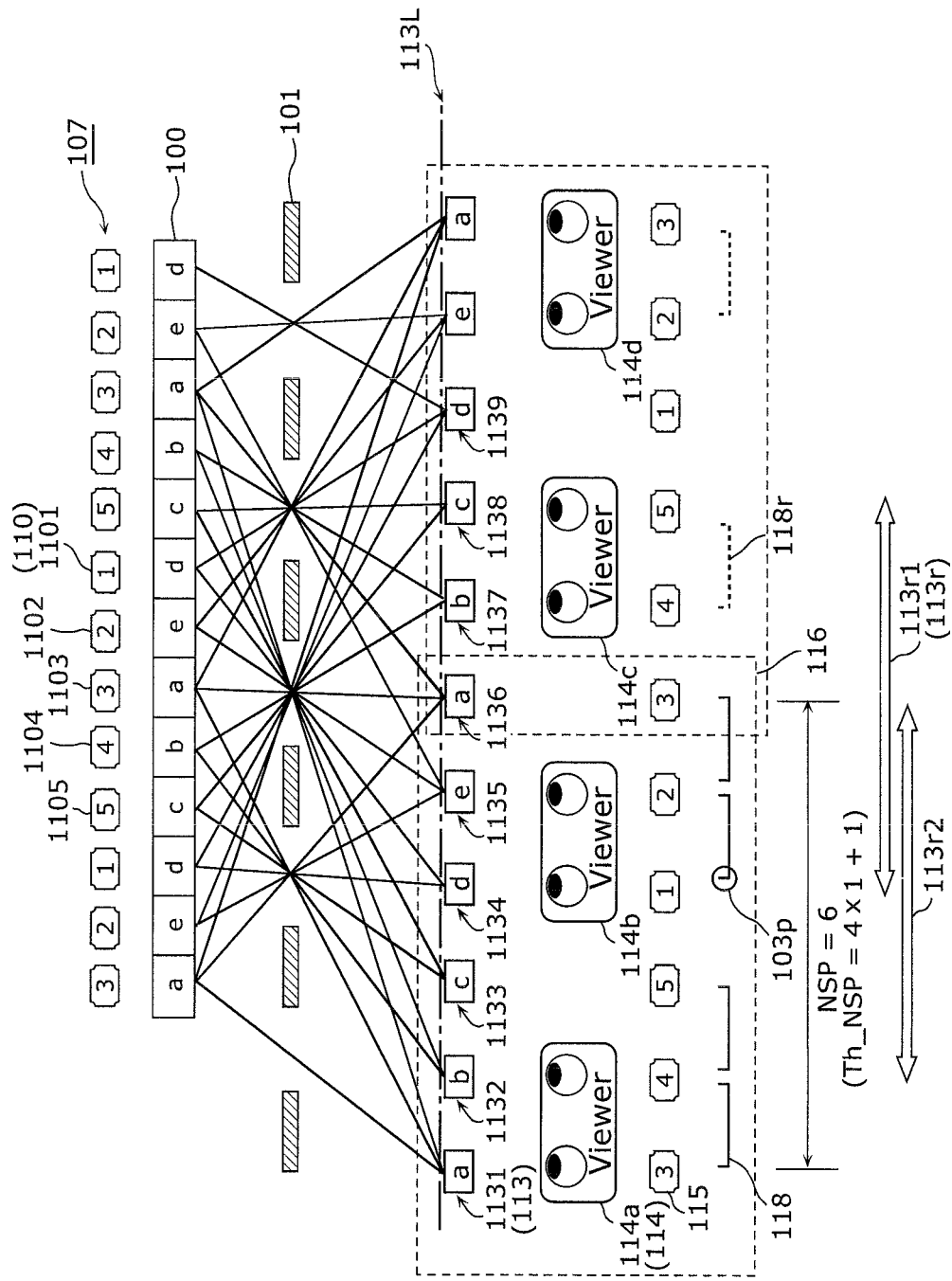
FIG. 3 is a diagram schematically showing processing performed by the parallax image arrangement control unit of the stereoscopic video display apparatus according to Embodiment 1 of the present invention (in the case of four viewers)
Figure 4:
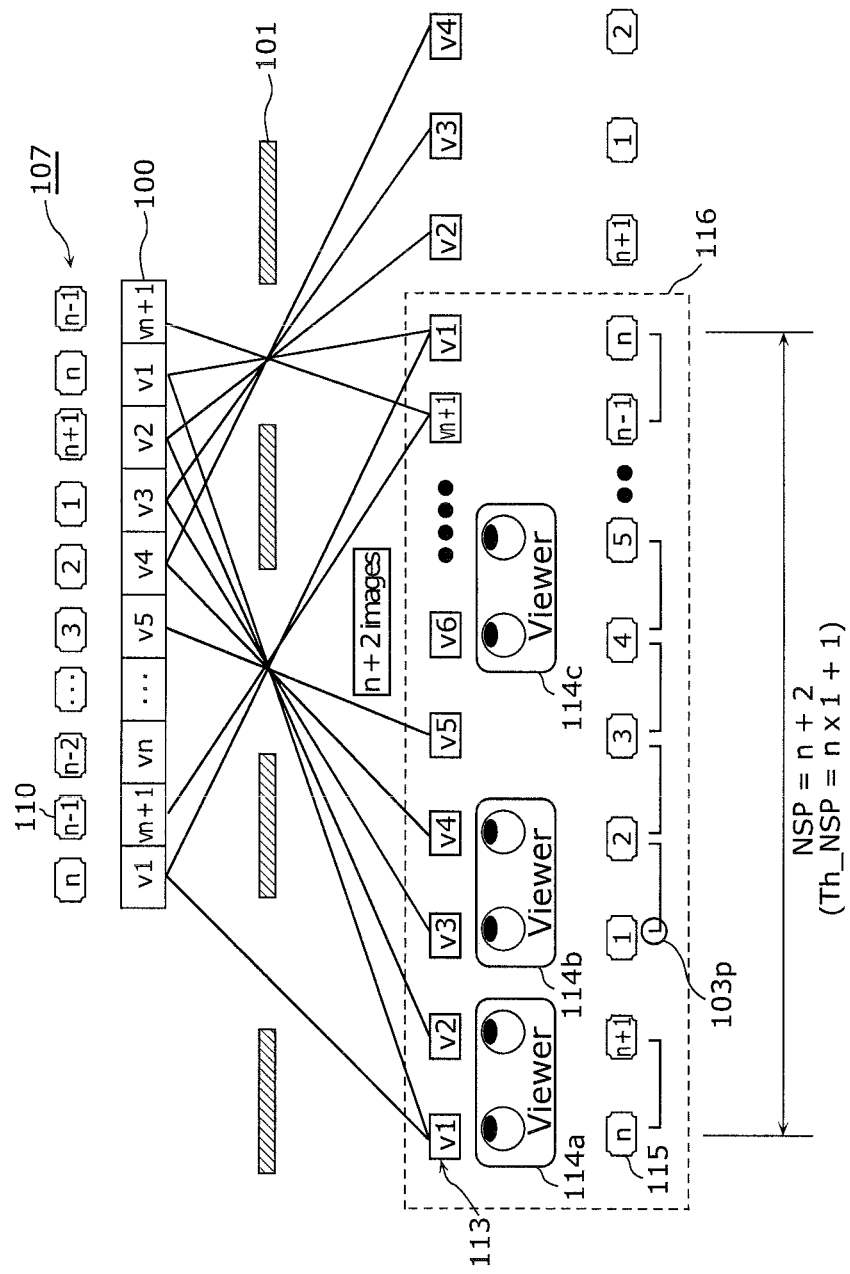
FIG. 4 is a diagram schematically showing processing performed by the parallax image arrangement control unit of the stereoscopic video display apparatus according to Embodiment 1 of the present invention (in the case of n number of viewers)
Figure 5:
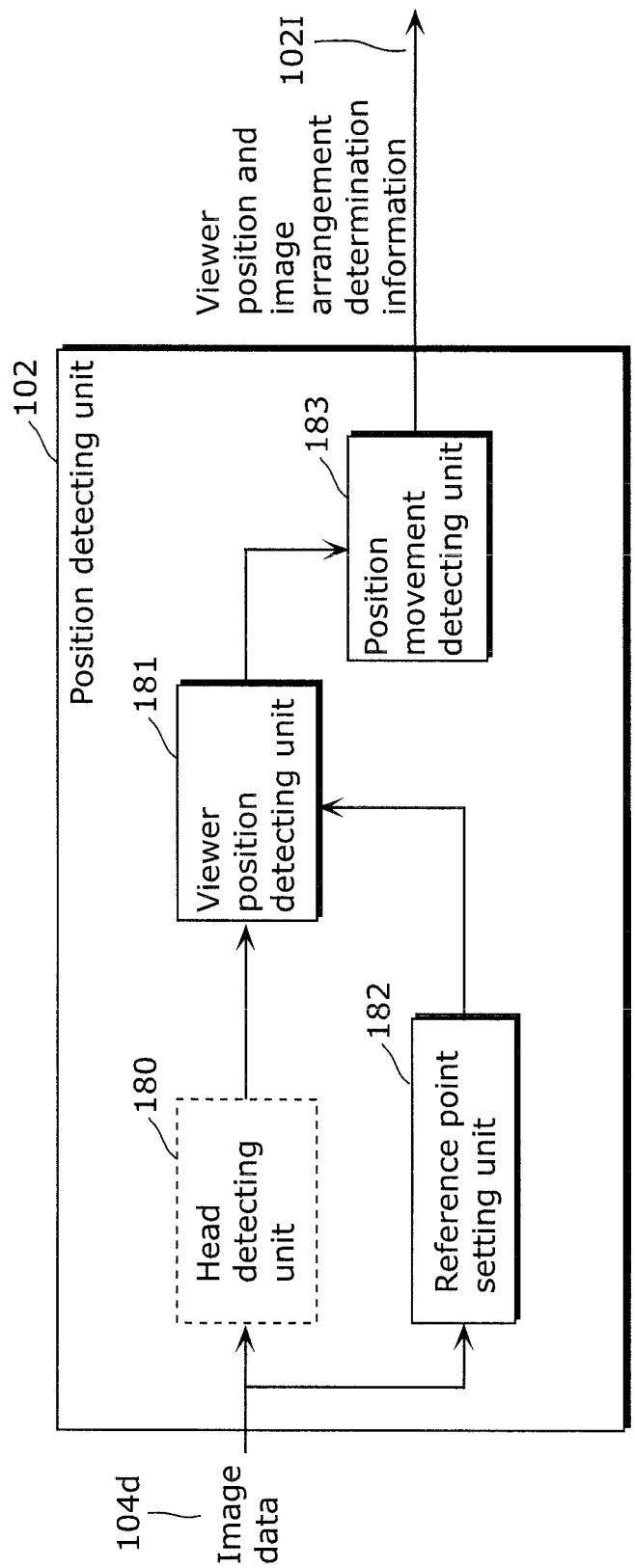
FIG. 5 is a diagram showing a structure of a position detecting unit of the stereoscopic video display apparatus according to Embodiment 1 of the present invention.
Figure 6:
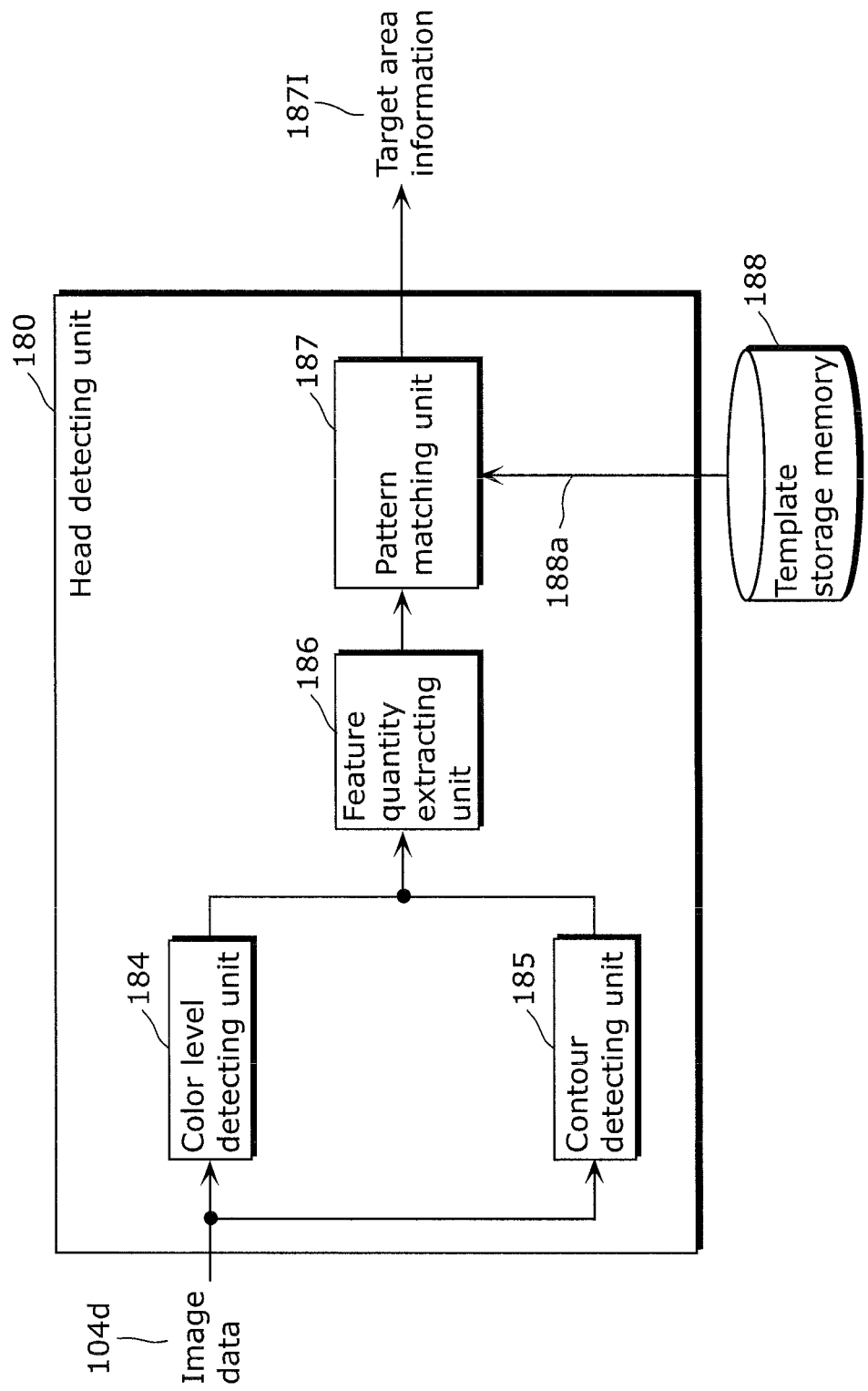
FIG. 6 is a diagram showing a structure of a head detecting unit of the stereoscopic video display apparatus according to Embodiment 1 of the present invention.
Figure 7:
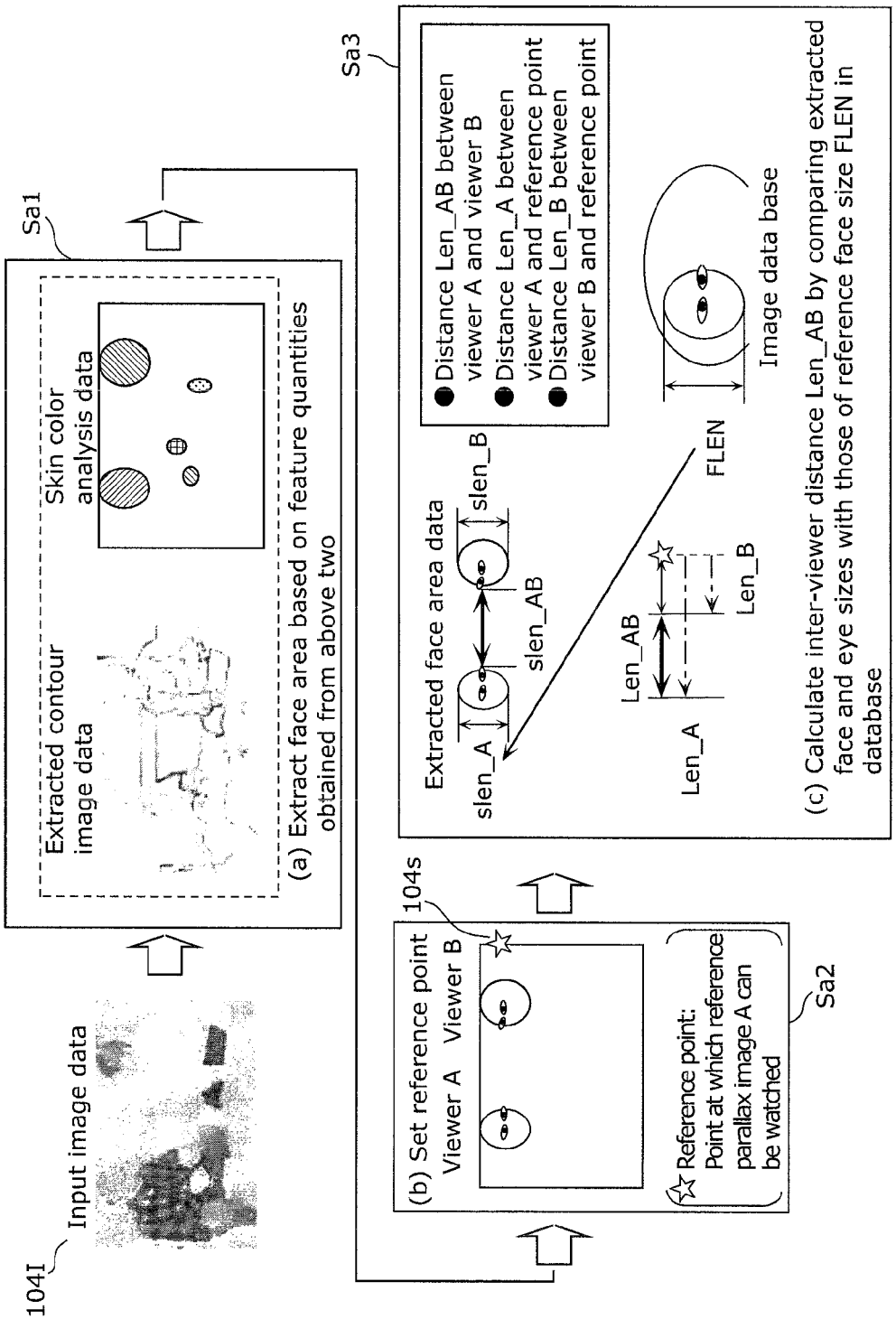
FIG. 7 is a diagram schematically showing processing performed by the position detecting unit of the stereoscopic video display apparatus according to Embodiment 1 of the present invention.
Figure 8:
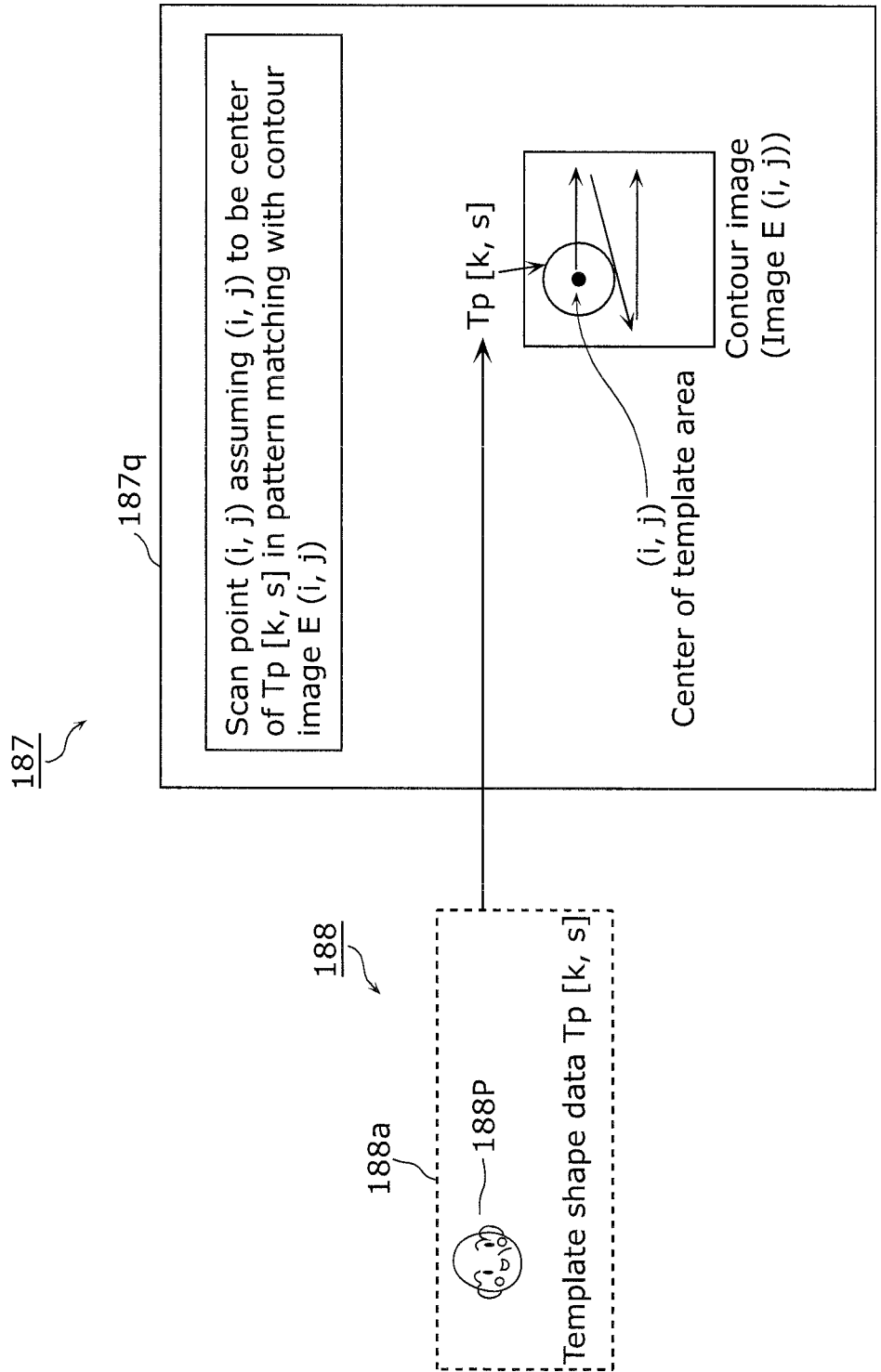
FIG. 8 is a diagram showing processing performed by a pattern matching unit of the head detecting unit of the stereoscopic video display apparatus according to Embodiment 1 of the present invention.

FIG. 1 shows a configuration of a stereoscopic video display apparatus according to Embodiment 1. Each of FIG. 2 and FIG. 3 shows an example of parallax image arrangement control in the case where the number of viewers is 3. FIG. 4 shows a more general example of parallax image arrangement control in the case where the number of viewers is n. Here, display position intervals PLen between the display positions of the parallax images in sets of parallax images are assumed to be equal to inter-eye distances Leye. FIG. 5 shows a structure of a position detecting unit of a stereoscopic video display apparatus according to Embodiment 1. FIG. 6 shows a structure of a head detecting unit of the position detecting unit. FIG. 7 shows the outline of processing performed by the position detecting unit. FIG. 8 shows an example of pattern matching performed by the head detecting unit 180.

The stereoscopic display apparatus according to Embodiment 1 is described with reference to the aforementioned drawings.

FIG. 1 is a diagram showing a structure of a stereoscopic video display apparatus 100s.

As shown in FIG. 1, the stereoscopic video display apparatus 100s includes structural elements such as a two-dimensional display unit 100, a barrier part 101, a position detecting unit 102, a parallax image arrangement control unit 103, a camera 104, an initial adjustment unit 105, a barrier control circuit 106, and a display circuit 108.

The camera 104 captures an image (image 104I) of an area 100R in which a viewer 100x (a viewer 100x1, for example) is present.

The position detecting unit 102 detects a position change of the viewer 100x, based on the captured image 104I.

The initial adjustment unit 105 performs adjustment of parameters which are used by the position detecting unit 102 to detect the viewer positions at the time when, for example, the stereoscopic video display apparatus 100s is initially disposed in a living room or the like of a home, and adjustment of a display device, a parallax barrier, and the like.

The two-dimensional display unit 100 displays two-dimensional parallax images.

The display circuit 108 is a display circuit for allowing the two-dimensional display unit 100 to display a stereoscopic video, and may be a control circuit for controlling operations by the two-dimensional display unit.

The barrier part (also referred to as a dividing unit composed of parallax barriers and disparity barriers) 101 selectively passes through or blocks light 101L from images from the two-dimensional display unit 100.

This allows part of the light 101L to enter a predetermined display position (viewing position 113 in FIG. 2) for a parallax image (image 110) corresponding to the light part. In this way, the parallax image is displayed at the display position. In this way, when an eye (the left eye or the right eye) of the viewer 114 is at the position, the image displayed at the position is watched using the eye.

The barrier control circuit 106 controls operations performed by the barrier part 101.

The parallax image arrangement control unit 103 performs optimized control of the arrangement of parallax images which are displayed on the two-dimensional display unit 100, based on the result of detection (information 102I output) by the position detecting unit 102 (the arrangement relates to the viewing position 113 at which the image 110I is displayed, or the like.).

The storage unit 107s is a Random Access Memory (RAM) or the like. The storage unit 107s stores a parallax image sequence 107 to be displayed on the two-dimensional display unit 100, and allows display of the stored parallax image sequence 107.

Here, when the barrier part 101 (parallax barriers or disparity barriers) is made of a thin film, the thin-film parallax barrier is a fixed barrier. For this reason, in this case, the initial adjustment unit 105 does not perform barrier position and pitch adjustment. In this case, the barrier control circuit 106 performs control of selectively making the whole film transparent or making the barrier function effective (control of selectively passing through or blocking light).

For convenience of explanation, the whole element composed of the two-dimensional display unit 100 and the barrier part 101 is referred to as a display unit 100h as necessary.

Here, the stereoscopic video display apparatus 100s may be a television apparatus, for example. In other words, the stereoscopic video display apparatus 100s may receive signals of a parallax image sequence 107 included in a stereoscopic video to be broadcast, and cause the aforementioned display unit 100h to display the parallax image sequence 107 produced by the received signals. The stereoscopic video display apparatus 100s may display the stereoscopic video in a manner that allows a viewer 114 to perceive the produced stereoscopic video.

First, the initial adjustment unit 105 performs adjustment of parameters which are used by the position detecting unit 102 to detect the positions of the viewers at the time when the stereoscopic video display apparatus 100s is initially disposed in the living room or the like of the home, and adjustment of the display device, the parallax barrier, and the like, based on the image (image 104I) captured by the camera 104 and the result (information 102I) obtained by the position detecting unit 102.

In this case, in the case of using an active parallax barrier using a TFT liquid crystal panel, the pitch widths and positions of the barriers are adjusted correspondingly to predetermined optimum viewing distances (control of the positions of open portions and block portions is performed in units of a pixel or a sub-pixel).

FIG. 5 is a diagram showing a structure of the position detecting unit 102.

FIG. 6 is a diagram showing a structure of the head detecting unit 180 (see FIG. 5) included in the position detecting unit 102.

Adjustment of parameters relating to the position detection may be performed in the following manner. The adjustment is performed using an image of viewers at a predetermined viewing distance and facing toward a camera. The adjustment is performed to extract the face portion in each of the captured images, and involves adjustment of a luminance distribution and/or a color distribution of each of the captured images and adjustment of parameters as thresholds in pattern matching described later. The adjustment further involves adjustment of reference values for calculating the distance(s) between viewers. More specifically, the adjustment involves calculating a relative ratio RFace between the size of a reference face image FLEN (FIG. 7) in a template storage memory (an image database) 188 (FIG. 6) and an extracted size of an image of a front view of a face len. This will be described in detail later.

FIG. 7 is a diagram schematically showing processing performed by the position detecting unit 102.

The position detecting unit 102 evaluates the visibility of a stereoscopic video using a test image which is an image captured at an optimum viewing distance. Based on the visibility, the degree of blur/fusion, etc. determined in the aforementioned evaluation, the display circuit 108 performs tuning of gray-scale characteristics and parallax amount control in a representative L and R parallax image set (the parallax amount control includes intensity control using linear coefficients and horizontal shift amount adjustment). The aforementioned adjustment corresponds to adjustment for allowing viewing of a reference parallax image A at a reference point (a point 104s shown as a white star) in FIG. 7.

In order to perform the aforementioned adjustment, in particular to increase the position detection accuracy, position detection processing as shown in FIG. 7 is performed.

First, the camera 104 captures an image of an area (for example, a part of an area 100R in FIG. 1 or the whole area 100R) in which viewers are seemingly present.

The camera 104 must be a camera that satisfies a certain condition of having an image angle that allows capturing an image of the area in which the viewers are seemingly present. When the area is assumed to be part of a living room, an example of such condition is that a viewing angle of 100 degrees with respect to the television (TV) is obtained in the are and that a viewing distance of 1.5 m to 6.7 m from the television (TV) is obtained in the area.

Based on the captured images, the head detecting unit 180 (FIGS. 5 and 6) extracts the viewer's head area (image areas including the user's head) (see processing Sa1 in the case of (a) in FIG. 7).

On the other hand, the reference point setting unit 182 (FIG. 5) sets a reference point (point 104s) in the case of detecting a relative size of each of the viewer's heads (see processing Sat in the case of (b) in FIG. 7).

Next, as shown as the case of (c) (processing Sa3) in FIG. 7, the viewer position detecting unit 181 (FIG. 5) detects the heads of two viewers A and B (the aforementioned viewers), and calculates the distance Len_AB between the viewer A and the viewer B, the distance Len_A between the viewer A and the reference point, and the distance Len_B between the viewer B and the reference point.

In this case, as shown as the case of (c), the size FLEN of the reference face image held in the template storage memory (image database) 188 is compared with the following values. The values are a representative value of the size slen_A of an image area including the head of the viewer A and a representative value of the size slen_B of an image area including the head of the viewer B. A relative ratio RFace is calculated by comparing each of these representative values with the aforementioned FLEN.

Next, the following Expression 1 is calculated in which the calculated relative ratio RFace is used as a coefficient for slen_AB, slen_A, and slen_B.

(Math. 1)

$$Len\_A = slen\_A \times RFace$$

$$Len\_B = slen\_B \times RFace$$

$$Len\_AB = slen\_AB \times RFace \quad (1)$$

Here, in the case of using a prepared reference face image A, an extracted size slen_A which is of the viewer A in a viewing area and with respect to the reference face image A may be used in the comparison with FLEN as one of the aforementioned sizes (slen_A, slen_B) of the heads of the viewers in the viewing area extracted and compared with FLEN. Alternatively, the average value of slen_A and slen_B may be used in the comparison with FLEN.

Lastly, the position movement detecting unit 183 (FIG. 5) detects whether or not each of the viewer A and the viewer B has moved, based on variation amounts dLenAB, dLenA, and dLenB of Len_AB, Len_A, and Len_B that are position information of the viewer's positions a predetermined time before.

In this case, a distance between parallax images is an inter-eye distance Leye, and thus a threshold value Leye/2 is set as a threshold value which enables sufficient suppression of crosstalk.

When at least two of the variation amounts dLenAB, dLenA, and dLenB are greater than Leye/2, the position detecting unit 102 detects a position movement of a viwer's head and outputs viewer position information (Len_AB, Len_A, and Len_B) and a signal for controlling parallax image arrangement suitably for such position movement.

FIG. 6 shows an exemplary detailed structure of the head detecting unit 180 (FIG. 5).

As shown in FIG. 6, the template storage memory 188 may be configured in form of an external memory outside the head detecting unit 180. Optionally, the template storage memory 188 may be included in the head detecting unit 180.

The contour detecting unit 185 obtains contour information from an input color image signal (image data).

Processing performed here by the contour detecting unit 185 is described in detail below.

The contour detecting unit 185 performs two-dimensional filtering using a two-dimensional filter having a size of 3×3 according to Expression 2 shown below, and calculates a differential vector vd (i, j), (xd (i, j), yd (i, j)) of each of pixels (i, j) in each image according to Expression 3 shown below.

(Math. 2)

$$fx = \begin{bmatrix} fx_{00} & fx_{10} & fx_{20} \\ fx_{01} & fx_{11} & fx_{21} \\ fx_{02} & fx_{12} & fx_{22} \end{bmatrix} = \begin{bmatrix} -1 & 0 & 1 \\ -2 & 0 & 2 \\ -1 & 0 & 1 \end{bmatrix}, \quad (2)$$

$$fy = \begin{bmatrix} fy_{00} & fy_{10} & fy_{20} \\ fy_{01} & fy_{11} & fy_{21} \\ fy_{02} & fy_{12} & fy_{22} \end{bmatrix} = \begin{bmatrix} -1 & -2 & -1 \\ 0 & 0 & 0 \\ 1 & 2 & 1 \end{bmatrix}$$

(Math. 3)

$$xd(i, j) = \sum_{n=-1}^{1} \sum_{m=-1}^{1} fx_{n+1 m+1} \cdot k(i-n, j-m) \quad (3)$$

$$yd(i, j) = \sum_{n=-1}^{1} \sum_{m=-1}^{1} fy_{n+1 m+1} \cdot k(i-n, j-m)$$

Furthermore, the contour detecting unit 185 calculates the size stv (i, j) of the differential vector vd (i, j) according to the following expression: stv (i, j)=(xd (i, j)×xd (i, j)+yd (i, j)×yd (i, j))^0.5.

The contour detecting unit 185 performs such contour pixel extraction by comparing the aforementioned stv (i, j) in each pixel (i, j) with a predetermined threshold TH2 according to Expression 4 shown below.

Expression 4 is for binarization performed to show whether or not each of the pixels in an image formed using color image signals is one of the pixels included in the contour. Here, when E (i, j)=1 is satisfied, the pixel (i, j) is included in the contour.

(Math. 4)

$$E(i, j) = \begin{bmatrix} 1 & \text{if } (stv(i, j) \geq TH2) \\ 0 & \text{if } (stv(i, j) < TH2) \end{bmatrix} \quad (4)$$

In this way, the contour information E (i, j) (hereinafter, simply referred to as "contour information Ei" as necessary) calculated by the contour detecting unit 185 is output to the feature quantity extracting unit 186 (FIG. 6).

The color level detecting unit 184 (FIG. 6) calculates a skin-color level of each of the pixels in each cluster classified using a color distribution.

Furthermore, the color level detecting unit 184 converts each pixel in each cluster into color level information such that each pixel in a cluster including a larger number of pixels having a higher skin-color level into color level information indicating a value closer to 1.0, and outputs the color level information resulting from the conversion.

The feature quantity extracting unit 186 also receives such color level information, and calculates a person likelihood FHi (i, j), based on the contour information and the feature quantity that is extracted from the skin-color level amount.

The person likelihood FHi (i, j) may be calculated by linear combination of two feature quantities, or by non-linear conversion.

Alternatively, it is possible to determine a raw Ei to be the person likelihood FHi (i, j) for a pixel having a high skin-color level, and, for a pixel having a low skin-color level, to output, as the person likelihood FHi (i, j), a value obtained by multiplying the contour information Ei by a coefficient for reducing the contour information Ei.

Alternatively, it is possible to calculate such person likelihood FHi (i, j) based only on the contour information Ei without using the skin-color level.

The pattern matching unit 187 extracts a target area by performing pattern matching of the shape of the area identified based on the person likelihood FHi obtained by the feature quantity extracting unit 186 with respect to the shape of shape data of the target area prepared and stored in advance in the template storage memory 188.

Examples of such a target area in the extraction includes a face area, a body area (the upper body, or the whole body), face part areas such as the eye(s), nose, and mouth, etc.

It is to be noted here that, in the case of using a face area, a reference shape data of a face area needs to be held in the template storage memory 188 (such reference shape data may be plural data items, possibly plural data items of shape in different directions).

In another case of using a body area, a reference shape data of a body area needs to be held in the template storage memory 188 (such reference shape data may be plural data items regarding the upper body or the whole body, possibly plural data items of shape in different directions).

In another case of using a face part area of the eye(s), nose, or mouth as the target area, a reference shape data of a corresponding face part area needs to be held in the template storage memory 188.

In this way, the pattern matching unit 187 extracts the target area (target area information 187I in FIG. 6) by performing pattern matching between the shape data Tp [k, s] (p=1, ..., Pnum) (k=0, 1, ..., Wp−1) (s=0, 1, ..., Hp−1) and the feature quantity information FH (i, j) of each pixel (i, j).

Here, Pnum denotes the number of templates. Wp and Hp denote the number of horizontal pixels and the number of vertical pixels of a rectangular template, respectively.

FIG. 8 is a schematic diagram for illustrating an example of a pattern matching method.

FIG. 8 shows an exemplary simple method although the pattern matching unit 187 (see FIG. 6) is intended to perform various kinds of pattern matching methods. The pattern matching unit 187 executes processing 187q for executing the method.

Hereinafter, this method is described.

A candidate rectangular area SR [i, j, Wp, Hp] is set for a template 188P. This area has a pixel (i, j) as its center, and has a horizontal width Wp and a vertical width Hp.

An evaluation function R (i, j, p) is calculated according to Expression 5 shown below, based on the contour information E (i, j) in the set candidate rectangular area SR [i, j, Wp, Hp] and shape data Tp [k, s] identifying the shape of the template 188P stored in the template storage memory 188 (the shape data Tp [k, s] is data 188a in FIG. 8, (k=0, ..., Wp−1) (s=0, 1, ..., Hp−1)).

(Math. 5)

$$R(i, j, p) = \sum_{k=0}^{Wp-1} \sum_{s=0}^{Hp-1} Tp[k, s] \cdot E(i - Wp/2 + k, j - Hp/2 + s) \quad (5)$$

Next, MR that is the maximum evaluation function R (i, j, p) is calculated for the template 188P and a pixel (i, j), according to Expression 6 shown below.

In Expression 6, MAX denotes the maximum value of R (i, j, p) for the pixel (i, j) and the template 188P.

When the maximum value MR is equal to or greater than a predetermined threshold value THMR, the candidate rectangular area SR [i, j, Wp, Hp] corresponding to the maximum value MR is extracted as desired target area information BestSR [i, j, W, H].

(Math. 6)

$$BestSR[i, j, W, H] = \\ \left\{ SR[i, j, Wp, Hp] \mid MR = \max_{(i,j),p}\{R(i, j, p)\}, MR \geq THMR \right\} \quad (6)$$

In this way, comparison with the predetermined threshold value THMR makes it possible to suppress matching with noise or the like.

When the maximum value MR is smaller than the threshold value THMR, information items [width/2, height/2, width, and height] of an input image are output as the target area information BestSR [i, j, W, H], assuming that there is no such target area.

Here, width represents the number of horizontal pixels of an input image, and height represents the number of vertical pixels of the input image.

As described above, the target area information BestSR [i, j, W, H] obtained by the pattern matching unit 187 is output as the target area information 187I (in FIG. 6) by the head detecting unit 180.

When a signal indicating that a detection of a position movement (see information 1021 in FIG. 5) is output by the position detecting unit 102, the parallax image arrangement control unit 103 (FIG. 1) performs optimum arrangement of parallax images displayed on the two-dimensional display unit 100.

Each of FIGS. 2, 3, and 4 shows an example of such optimum arrangement.

FIG. 2 shows an example of parallax image arrangement control in the case where the number of viewers n is 3. FIG. 3 shows an example of parallax image arrangement control in the case where the number of viewers n is 4. FIG. 4 shows a more general example of parallax image arrangement control in the case where the number of viewers is n.

As mentioned above, FIG. 2 is a diagram showing an exemplary parallax image arrangement control in the case of n=3.

First, such an example in the case where the number of viewers n is 3 is described with reference to FIG. 2.

FIG. 2 (and each of FIGS. 3 and 4 in the description below) shows a panel (two-dimensional display unit) which displays images (two-dimensional parallax images).

In addition, parallax images 110 are displayed on the panel 100.

FIG. 2 further shows barrier part (parallax barriers) 101 for displaying light 101Lp from each of the parallax image (image 110: for example, an image 1101) at a predetermined viewing position (viewing position 1132) by passing through or blocking the light.

FIG. 2 further shows viewing positions 113 (viewing positions 1131, 1132, etc.) on a straight line 113L apart from the panel 100 by a predetermined distance.

FIG. 2 further shows a combination 118 (a combination 118a) of two viewing positions that are a left-eye position (viewing position 1132) of a viewer 114 (for example, a first viewer 114a) and a right-eye position (viewing position 1133) of the viewer 114.

FIG. 2 further shows parallax image numbers (1, 2, ...) of the parallax images 115 (parallax images 110) viewed at corresponding viewing positions 113.

FIG. 2 further shows a unit of setting 116 used to perform arrangement setting for each parallax image 115 to be displayed. Here, the unit of setting 116 is a unit of at least two positions (five in the case of FIG. 2).

Here, a position interval Plen is a position interval between two mutually adjacent viewing positions 113 (viewing positions 1131 and 1132) at which the two images (parallax images) 115 are displayed. The position interval PLen is identical to an inter-eye distance Leye that is a distance between the left eye and the right eye of the viewer 114. In this example, the two viewing positions (viewing positions 1132 and 1133) that are the positions of the left- and right-eye of the viewer 114 (for example, the first viewer 114a) match the positions of two mutually adjacent parallax images (for example, the image 1101 at the viewing position 1132 and the image 1102 at the viewing position 1133).

The points at which the viewers 114 are respectively shown in FIG. 2 show the positions of the viewers 114. More specifically, the positions of the viewers 114 show the positions of the eyes of the viewers 114.

For example, FIG. 2 shows that the left-eye position (viewing position 1132) of the left eye among the two eyes of the first viewer 114a is at the display position of the parallax image 1101, and the right-eye position (viewing position 1133) of the right eye of the viewer 114a is at the display position of the parallax image 1102.

As described earlier, the position interval PLen between the positions (for example, the viewing positions 1132 and 1133) of the mutually adjacent parallax images 115 (for example, two parallax image 110) is identical to the inter-eye distance Leye that is the distance between the left and right eyes of the viewer 114.

For this reason, when there are three viewers 114 (the first viewer 114a, a second viewer 114b, and a third viewer 114c), the number of parallax images NumP required to control arrangement of the parallax images 115 is obtained according to NumP=(the number of viewers n+1)=4 (the first to fourth parallax images 1101 to 1104).

In other words, the parallax images 110 displayed at the pixel sequence positions (a, b, c, d, and a) on the panel 100 are selected from a set (OF4={j|j a set of (1, 2, 3, 4)}) of the four parallax images (the first to fourth parallax images 1101 to 1104).

Here, it is assumed that pseudo stereoscopy occurs when the parallax image number of the parallax image that enters the right eye (position) of at least one of the viewers 114 is smaller than the parallax image number of the parallax image that enters the left eye of the viewer 114.

In this case, as shown in FIG. 2, the unit of setting 116 used when setting the arrangement of the parallax images to be displayed is composed of five viewing positions 113 (a, b, c, d, and a) below (along) the straight line 113L. For example, the unit 1161 that is one of units of setting 116 includes five viewing positions of 1131 to 1135.

In this way, the unit is composed of not four viewing positions but five viewing positions because of the need to consider a combination of the viewing positions d and a.

The viewing positions 1131, 1132, 1133, 1134, and 1135 in the unit of setting 116 (unit 1161) show the parallax image display positions at which parallax images a, b, c, d, and a second parallax image a are displayed respectively.

Here, 4 is obtained as the number of parallax image display positions NSP between the first parallax image display position (viewing position 1132) and the last parallax display image position (viewing position 1135) among the parallax image display positions corresponding to the positions of the eyes of the three viewers 114a to 114c within the unit of setting 116.

NSP=NumP is satisfied when comparing this value with the required number of parallax images NumP=4.

Here, NumP is a reference value for the arrangement control, and is also defined as Th_NSP as shown in FIG. 2 etc.

In this case, each of the positions from the first parallax image display position (viewing position 1132) to the last parallax image display position (viewing position 1135) is set as the position for a corresponding one of the eyes of the viewers.

First, the first parallax image 1101 in the parallax image set OG4 is placed at the first eye position (viewing position 1132). Then, the remaining parallax images having parallax image numbers incremented by 1 with each of rightward shifts of the parallax image display positions are sequentially assigned to the corresponding parallax image display positions.

In this way, parallax image arrangement without pseudo stereoscopy is achieved in the whole unit of setting 116 including, as the last parallax image display position, the second parallax image display position (viewing position 1135) a.

The parallax image display position a (viewing position 1135) located at the right end of a first unit of setting 116 also functions as the first parallax image display position a located at the starting position in a second unit of setting 116. The parallax image number assigned to the right-end image display position a that is a second parallax image display position a in the first unit of setting 116 is also assigned to a first parallax image display position a located at the starting position in the first unit of setting 116.

This makes it possible to achieve arrangement without pseudo stereoscopy also in this case.

A position 103p denoted as a circle in FIG. 2 denotes the parallax image display position for the first parallax image 1101 in the parallax image set OG4 as indicated by a parallax image display position number.

FIG. 3 is a diagram showing an example of an optimum arrangement control in the case where the number of viewers n is 4.

In this case, the required number of parallax images NumP is obtained according to NumP=(the number of viewers n+1)=5. The parallax images 110 displayed at the pixel sequence positions (a, b, c, d, e, and a) on the panel 100 are selected from a five parallax image set OG5={k|k a set of (1, 2, 3, 4, 5)} and then arranged.

The unit of setting 116 in the arrangement of parallax images to be displayed includes a second a because a combination of the e and a needs to be considered. For this reason, the unit of setting 116 is composed of six positions of (a, b, c, d, e, and a) which are the viewing positions 113.

The viewing positions 1131, 1132, 1133, 1134, 1135, and 1136 in the unit of setting 116 show the positions at which parallax images a, b, c, d, e and a second parallax image a are displayed respectively.

In this unit of setting 116, 6 is obtained as a value indicating the number of parallax image display positions NSP between the first parallax image display position (viewing position 1131) and the last parallax image display position 1136 among positions respectively corresponding to the eyes of the four viewers 114a to 114d.

This value is larger than the required number of parallax images NumP=5. This shows that there is a blank parallax image display position which is not yet assigned to any of the eyes of the viewers between the first parallax image display position and the last parallax image display position.

Unlike the case of FIG. 2, when there is a blank parallax image display position between the first parallax image display position (viewing position 1131) and the last parallax image display position (viewing position 1136) among the positions respectively corresponding to the eyes of the viewers 114, the parallax image numbers become discontinuous at the blank parallax image display position.

In this case, the first parallax image 1101 among the images 110 included in the parallax image set OG5 is placed at the parallax image display position (position 1134) immediately after the blank parallax image display position. Then, the remaining parallax images having parallax image numbers incremented by 1 with each of rightward shifts of the parallax image display positions are sequentially assigned to the corresponding parallax image display positions.

In this way, parallax image arrangement without pseudo stereoscopy is achieved in the whole unit of setting 116 including, as the last parallax image display position, the parallax image display position (position 1136) of the second a.

On the other hand, the parallax image display position a (viewing position 1136) located at the right end of a first unit of setting 116 also functions as the first parallax image display position a (viewing position 1136) located at the starting position in a second unit of setting 116. The parallax image number 3 assigned to the right-end image display position a that is a second parallax image display position a in the first unit of setting 116 is also assigned to a first parallax image display position a (viewing position 1131) located at the starting position in the first unit of setting 116. Then, the remaining parallax images having a sequentially incremented parallax image number are assigned to the corresponding parallax image display positions 1132 and 1133 the latter of which is the blank parallax image display position. In this way, it is possible to achieve image arrangement without pseudo stereoscopy even at the starting position of the unit of setting 116.

The position 1134 that is the position 103p denoted by the circle in FIG. 2 is the position for the first parallax image 1 (image 1101) in the parallax image set OG5 as indicated by the parallax image display position number.

FIG. 4 is a diagram showing a more general example of an optimum arrangement control of the parallax images in the case where the number of viewers is n.

Here, a distance between the mutually adjacent parallax images 110 is an inter-eye distance Leye. The number of parallax images NumP required for the parallax arrangement control for the n number of viewers is obtained according to the following Expression 7. First, FIG. 4 shows a case where the viewers are present at different positions (v1, v2, ..., vn, and vn+1).

(Math. 7)

$$\text{Num}P = (n+1) \quad (7)$$

At this time, the parallax images 110 which are respectively displayed at the pixel sequence positions (v1, v2, v3, ..., vn, and vn+1) on the panel 100 are correspondingly selected from the (n+1) set of parallax images OGn={k|k a set of (1, 2, 3, 4, 5, 6, 7, ..., n+1)} and then arranged.

As shown in FIG. 4, the unit of setting 116 used to set arrangement of the parallax images to be displayed is composed of the (n+2) number of positions (v1, v2, v3, v4, ..., vn, vn+1, and v1) which are the viewing positions 113.

First, the number of parallax image display positions NSP between the first parallax image display position and the last parallax image display position among the positions for the eyes of the n number of viewers is calculated, and compared with the required number of parallax images NumP=n+1.

As with the example of FIG. 3, when NSP>NumP is satisfied as shown in FIG. 4, there is a blank parallax image display position between the first parallax image display position and the last parallax image display position among the positions for the eyes of the viewers, which means that the parallax image numbers are discontinuous.

For this reason, the first parallax image 1 (image 1101) in the parallax image set OGn is displayed at the parallax image display position (position 103p) immediately after the blank parallax image display position.

Then, the remaining parallax images having parallax image numbers incremented by 1 with each of rightward shifts of the parallax image display positions are sequentially assigned to the corresponding parallax image display positions, starting with the position immediately after the position 103p.

Here, the parallax image number of the first parallax image display position v1 located at the right end of the unit of setting 116 is also assigned to the parallax image display position v1 located at the starting position of the unit of setting 116. Then, parallax image numbers sequentially incremented by 1 with each of rightward shifts of the parallax image display positions are assigned to the remaining parallax images starting with the parallax image located at the parallax image display position v2 and ending with the parallax image located at the position immediately left to the blank parallax image display position.

When NSP=NumP is satisfied, it is only necessary to perform the same processing as in the example of FIG. 2.

In this case, all the positions from the first parallax image display position and the last parallax image display position in the unit of setting 116 are set for the eyes of the viewers.

For this reason, the first parallax image 1 in the parallax image set OGn is placed at the position for the first eye, and the remaining parallax images having parallax image numbers incremented by 1 with each of rightward shifts of the parallax image display positions are sequentially assigned to the remaining parallax image display positions.

The parallax image display position v1 located at the right end of a first unit of setting 116 also functions as the first parallax image display position v1 located at the starting position in a second unit of setting 116. The parallax image number assigned to the right-end image display position v1 that is a second parallax image display position v1 in the first unit of setting 116 is also assigned to a first parallax image display position v1 located at the starting position in the first unit of setting 116. Then, parallax image numbers sequentially incremented by 1 with each of rightward shifts of the parallax image display positions are assigned to the remaining parallax image display positions up to the last parallax image display position among the positions of the eyes of the viewers in the first unit of setting 116. This makes it possible to achieve an optimum arrangement.

There is a case where the same parallax image numbers are recursively assigned to plural parallax image display positions and the parallax image display positions are respectively assigned for plural viewers (for example, this case is true of a case where a parallax image display position vn in the unit of setting in FIG. 4 is the last parallax image display position in the unit of setting).

A case where NSP>NumP is satisfied is similar to the earlier described case where there is no overlap in the viewing positions having the same parallax image number.

On the other hand, when NSP≤NumP is satisfied, plural parallax image display positions (viewing positions) having the same parallax image number are found between the first parallax image display position and the last parallax image display position among the positions of the eyes of the viewers in a unit of setting. For this reason, there is a blank parallax image display position which is not yet assigned to any of the eyes. As in the example of FIG. 2, it is possible to use a method of placing the first parallax image 1 in the parallax image set OGn at the position for the first eye and then placing the remaining parallax images each having a parallax image number incremented by 1 with a rightward shift in the parallax image display position to the corresponding parallax image display position.

Figure 17:
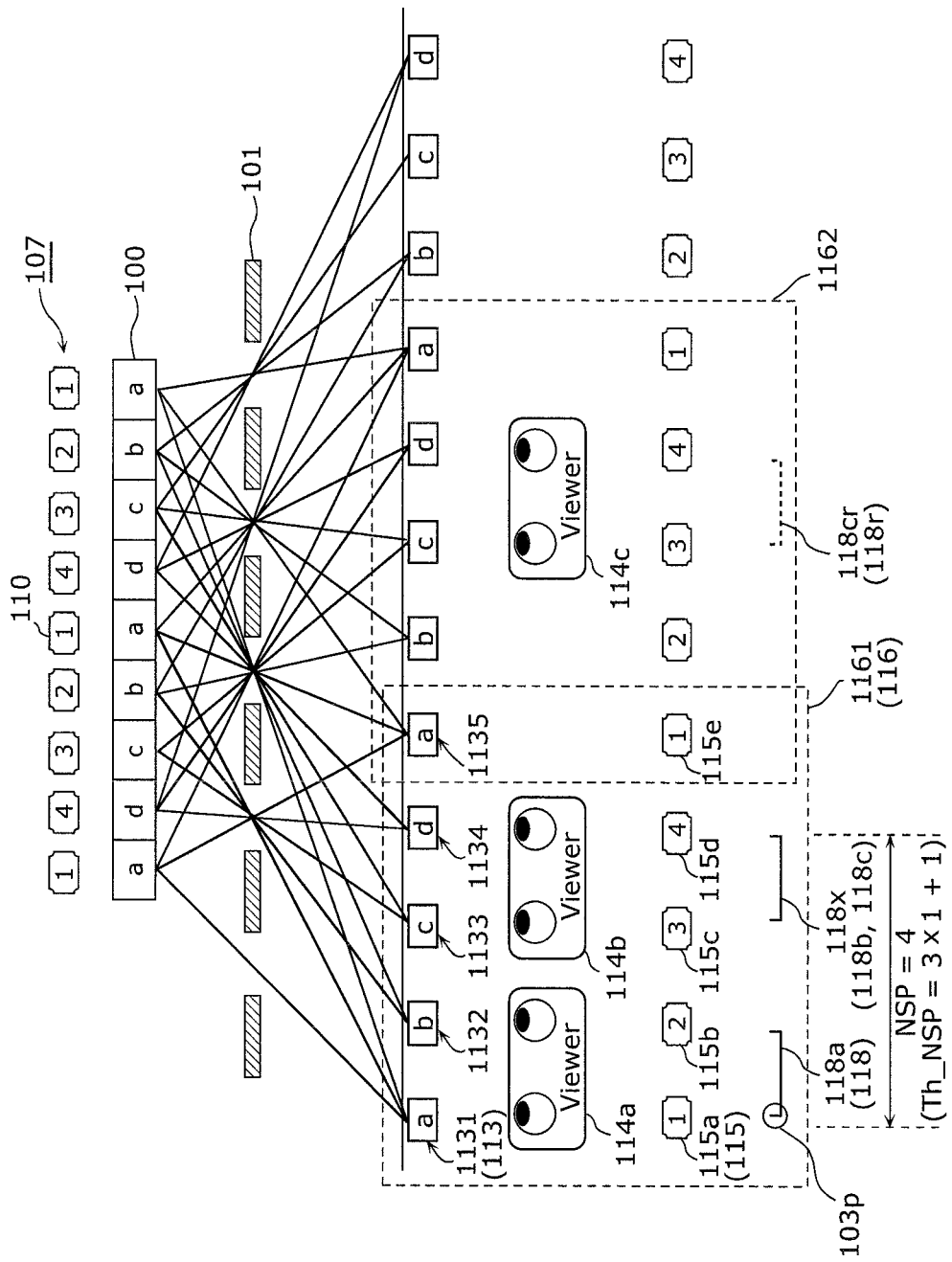
FIG. 17 is a diagram showing operations performed by the stereoscopic video display apparatus according to Embodiment 1.
Figure 18:
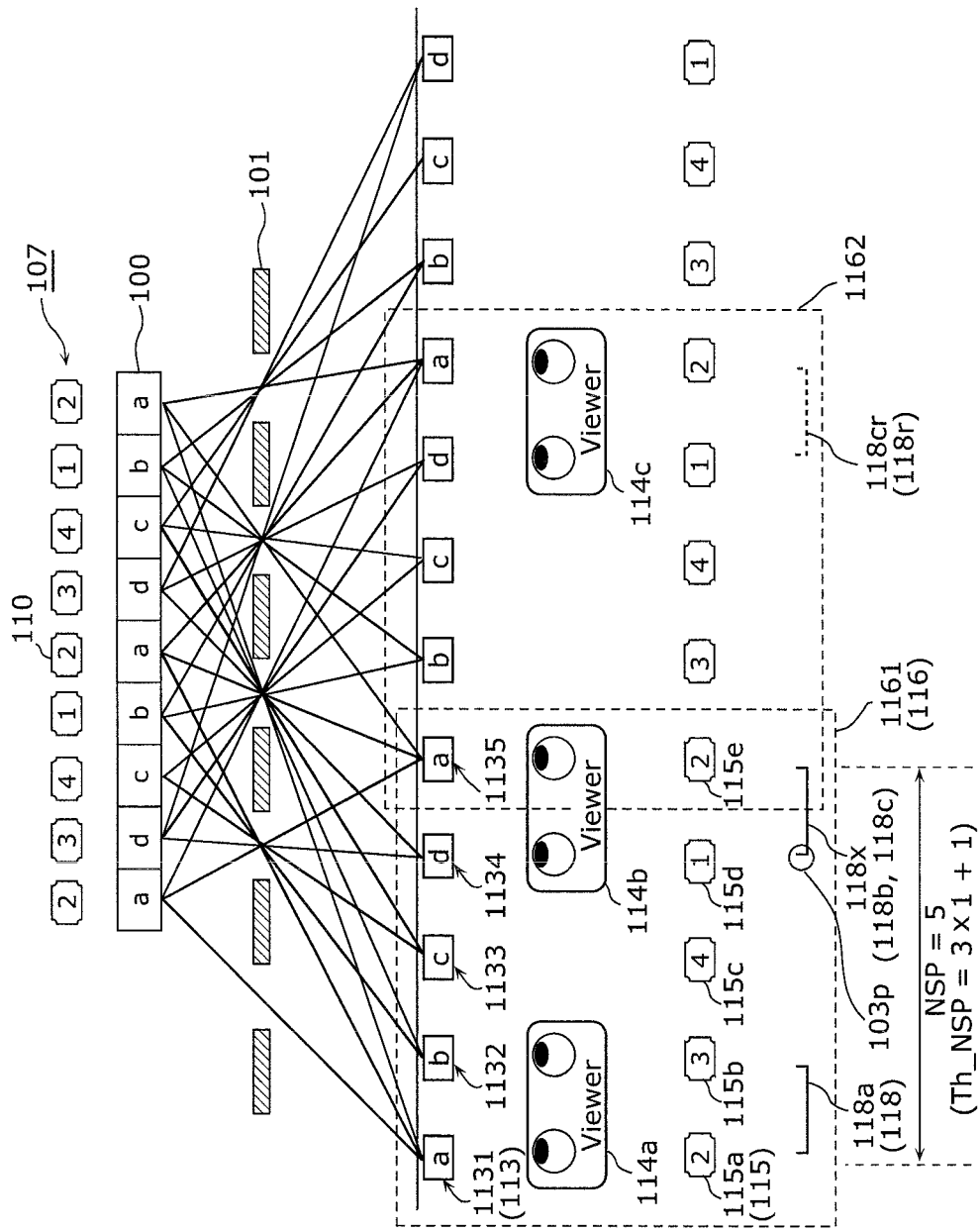
FIG. 18 is a diagram showing operations performed by the stereoscopic video display apparatus according to Embodiment 1.

Each of FIG. 17 and FIG. 18 shows a case where the number of viewers is 3.

In each of the cases of FIG. 17 and FIG. 18, some parallax image display positions (viewing positions) having the same parallax image numbers are respectively set for plural viewers between the first parallax image display position and the last parallax image display position among the positions of the eyes of the viewers in a unit of setting.

For this reason, two or more blank parallax image display positions are present in the unit of setting 116.

Even in this case, however, it is possible to suppress pseudo stereoscopy by arranging the images in the above-described manner.

For example, in the case of FIG. 17, NSP=NumP is satisfied. Thus, as in the case of the example of FIG. 2, it is possible to use a method of placing the first parallax image 1 in the parallax image set OGn at the position for the first eye and then placing parallax images each having a parallax image number incremented by 1 with a rightward shift in the parallax image display position to the corresponding parallax image display position.

In the case of FIG. 18, NSP>NumP is satisfied. Thus, as in the case of the example of FIG. 3, there is a blank parallax image display position between the first parallax image display position and the last parallax image display position among the positions respectively corresponding to the eyes of the viewers, and thus the parallax image numbers become discontinuous at the blank parallax image display position.

For this reason, the first parallax image 1 in the parallax image set OGn is displayed at the parallax image display position immediately after the blank parallax image display position. Then, the remaining parallax images having parallax image numbers incremented by 1 with each of rightward shifts of the parallax image display positions are sequentially assigned to the corresponding parallax image display positions. Here, the parallax image number of the parallax image display position v1 located at the right end of the unit of setting 116 is also assigned to the first parallax image display position v1 located at the starting position in the unit of setting 116. Then, parallax image numbers sequentially incremented by 1 with each of rightward shifts of the parallax image display positions are assigned to the remaining parallax images starting with the parallax image located at the parallax image display position v2 and ending with the parallax image located at the position just before the blank parallax image display position.

There is a case where the same parallax image numbers are recursively assigned to plural parallax image display positions and the parallax image display positions are respectively assigned for plural viewers (for example, this case is true of a case where a parallax image display position v7 in the unit of setting in FIG. 4 is the last parallax image display position among the positions of the eyes of the viewers in the unit of setting).

This case where NSP>NumP is satisfied is similar to the earlier described case. On the other hand, when NSP<NumP is satisfied, some parallax image display positions (viewing positions) having the same parallax image numbers are respectively set for plural viewers between the first parallax image display position and the last parallax image display position among the positions of the eyes of the viewers in a unit of setting. Thus, a blank parallax image display position which is not yet set for the eyes of the viewers is present in the unit of setting. For example, as with the case of the example of FIG. 2, it is possible to use a method of placing the first parallax image 1 in the parallax image set OGn at the first eye position and then assigning the remaining parallax images having parallax image numbers incremented by 1 with each of rightward shifts of the parallax image display positions to the corresponding parallax image display positions.

In this way, in cases such as a case in FIG. 4 where a parallax image number 1 is assigned to the parallax image display position vn+1 which also functions as the first parallax image display position in the second unit of setting, it is possible to suppress pseudo stereoscopy which occurs in the case where viewers are present correspondingly to the parallax image display position vn and vn+1.

As described above, in the case (1) where NSP≤NumP is satisfied, the first parallax image 1 in a parallax image set OG4 is placed at the position for the first eye, and then the remaining parallax images having parallax image numbers incremented by 1 with each of rightward shifts of the parallax image display positions are sequentially assigned to the corresponding parallax image display positions. Next, a description is given of the case (2) where NSP>NumP is satisfied. In this case, the parallax image number assigned to the first parallax image display position v1 located at the starting position in the parallax image set OGn is also assigned to a second parallax image display position v1 in the parallax image set OGn. Then, parallax image numbers are sequentially assigned to the succeeding parallax image display positions such that the parallax image numbers are sequentially incremented up to the second parallax image display position. Thus, the first parallax image 1 in the parallax image set OGn is placed at the parallax image display position immediately after the blank parallax image display position. Then, the remaining parallax images having parallax image numbers incremented by 1 with each of rightward shifts of the parallax image display positions are sequentially assigned to the corresponding parallax image display positions.

Here, the parallax image number assigned to the parallax image display position v1 located at the right end position of the unit of setting 115 is also assigned to the first parallax image display position v1 located at the starting position of the unit of setting 115. Then, the remaining parallax images starting with the parallax image located at the parallax image display position v2 are sequentially assigned to the parallax image display positions shifted one by one and lasting up to the position just before the blank parallax image display position.

In this way, n (the number of viewers)+1 number of parallax images are prepared and the number of parallax image display positions from the first parallax image display position to the last parallax image display position among the positions of the eyes of the viewers defined in the unit of setting is compared with the required number of parallax images. Thus, the stereoscopic video display apparatus according to the present invention allows viewers to view a stereoscopic video without causing pseudo stereoscopy even when three or more viewers watch the stereoscopic video at the same time.

Each of FIGS. 2 and 4 shows a case where the eyes of the viewers are placed respectively at specified positions. However, it is possible to perform parallax image arrangement without causing pseudo stereoscopy in a manner similar to the above case even when eyes of plural viewers are placed at one of the other possible parallax image display positions in any one of FIGS. 2 and 4.

In the case where the number of viewers n and the number of parallax images NumP are represented according to NumP=(n+1), it is also possible to perform parallax image arrangement without causing pseudo stereoscopy in a manner similar to the above case even when some parallax image display positions (viewing positions) having the same parallax image numbers are respectively set for plural viewers, instead of the case where in which the eyes of all of the viewers can correspond to mutually different parallax image display positions.

The parallax image arrangement control performed here is the one that is performed in the case of preparing (nmax+1) number of parallax images with respect to the maximum number of viewers nmax, detecting the positions of the heads of the viewers, determining whether or not there is a position movement based on the result of the detection, and, when there is such a position movement, displaying the parallax images according to the earlier described rule.

Accordingly, the present invention provides an advantageous effect of allowing the viewers to watch a stereoscopic video without causing pseudo stereoscopy even when the number of viewers who watch a stereoscopic video at the same time is from three to nmax inclusive in the case where parallax images are displayed at inter-eye distance intervals.

It is to be noted that, when plural viewers are present at mutually different positions (v1, v2, . . . , vn, vn+1), a result similar to the one obtainable in the aforementioned case is obtained in the following manner.

The first step is to determine a blank parallax image display position between the first parallax image display position and the last parallax image display position among the positions of the eyes of plural viewers by searching the unit of processing 116 from the first position to the last position.

The parallax image numbers are discontinuous at the blank parallax image display position.

For this reason, the first parallax image 1 in the parallax image set OGn is placed at the parallax image display position after the blank parallax image display position.

Then, the remaining parallax images having parallax image numbers incremented by 1 with each of rightward shifts of the parallax image display positions are sequentially assigned.

In addition, the parallax image number of a second parallax image display position v1 located at the right end in the unit of setting 116 is also assigned to a first parallax image display position v1 at the starting position in the unit of setting 116. Then, the remaining parallax images starting with the parallax image located at the parallax image display position v2 are sequentially assigned to the parallax image display positions shifted one by one and lasting up to the position just before the blank parallax image display position.

On the other hand, in cases as shown in FIGS. 17 and 18, a blank parallax image display position is created when the same parallax image number is recursively assigned to plural parallax image display position and the parallax image display positions are respectively set for plural viewers.

According to the above described method, in the case of FIG. 17, the first parallax image 1 in the parallax image set OGn is placed at the position for the first eye, and the remaining parallax images having parallax image numbers incremented by 1 with each of rightward shifts of the parallax image display positions are sequentially assigned to the corresponding parallax image display positions.

Figure 19:
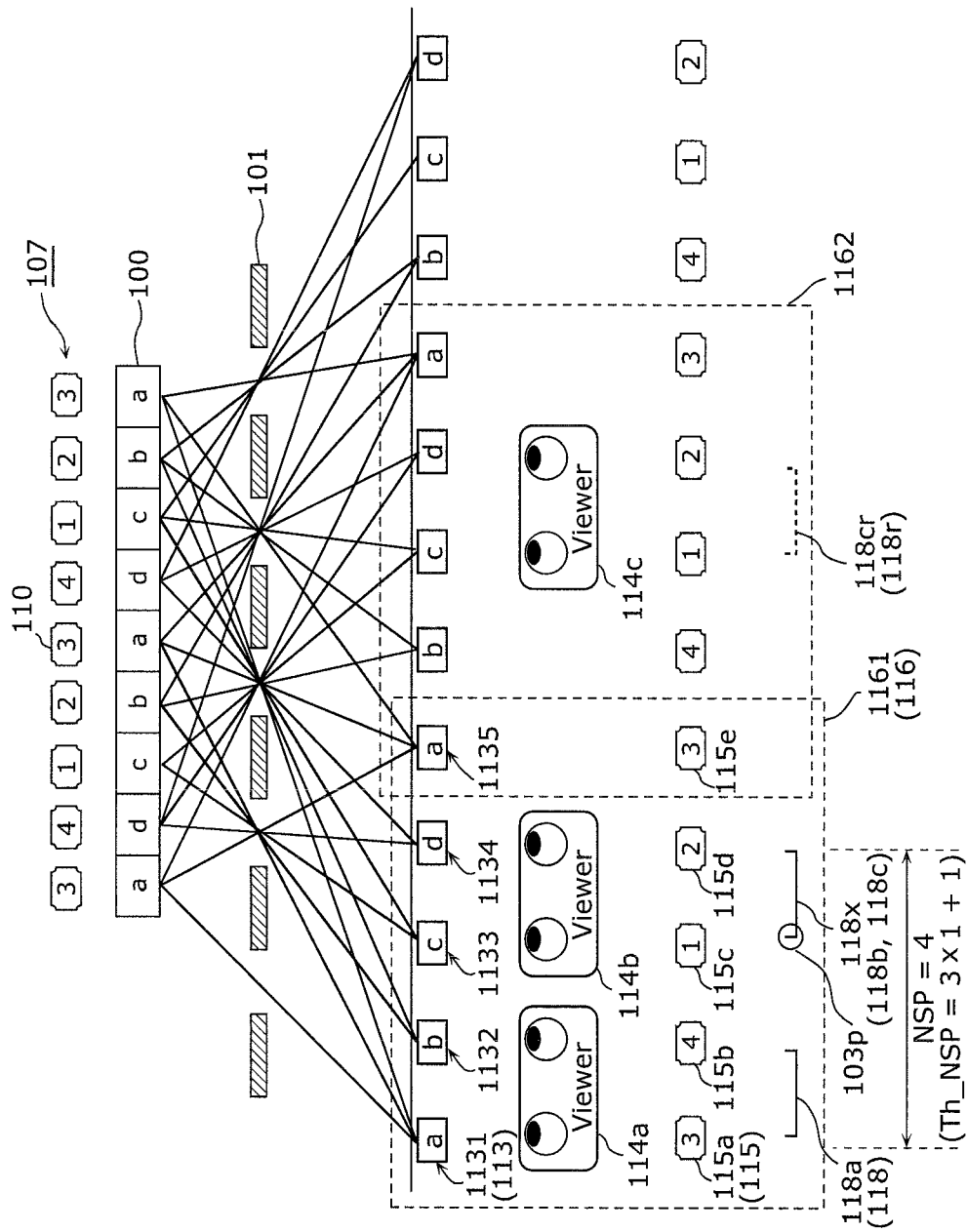
FIG. 19 is a diagram showing operations performed by the stereoscopic video display apparatus according to Embodiment 1.

However, as shown in FIG. 19, another method is also possible which involves arranging the first parallax image 1 in the parallax images set OGn at the parallax image display position immediately after the blank parallax image display position.

Figure 20:
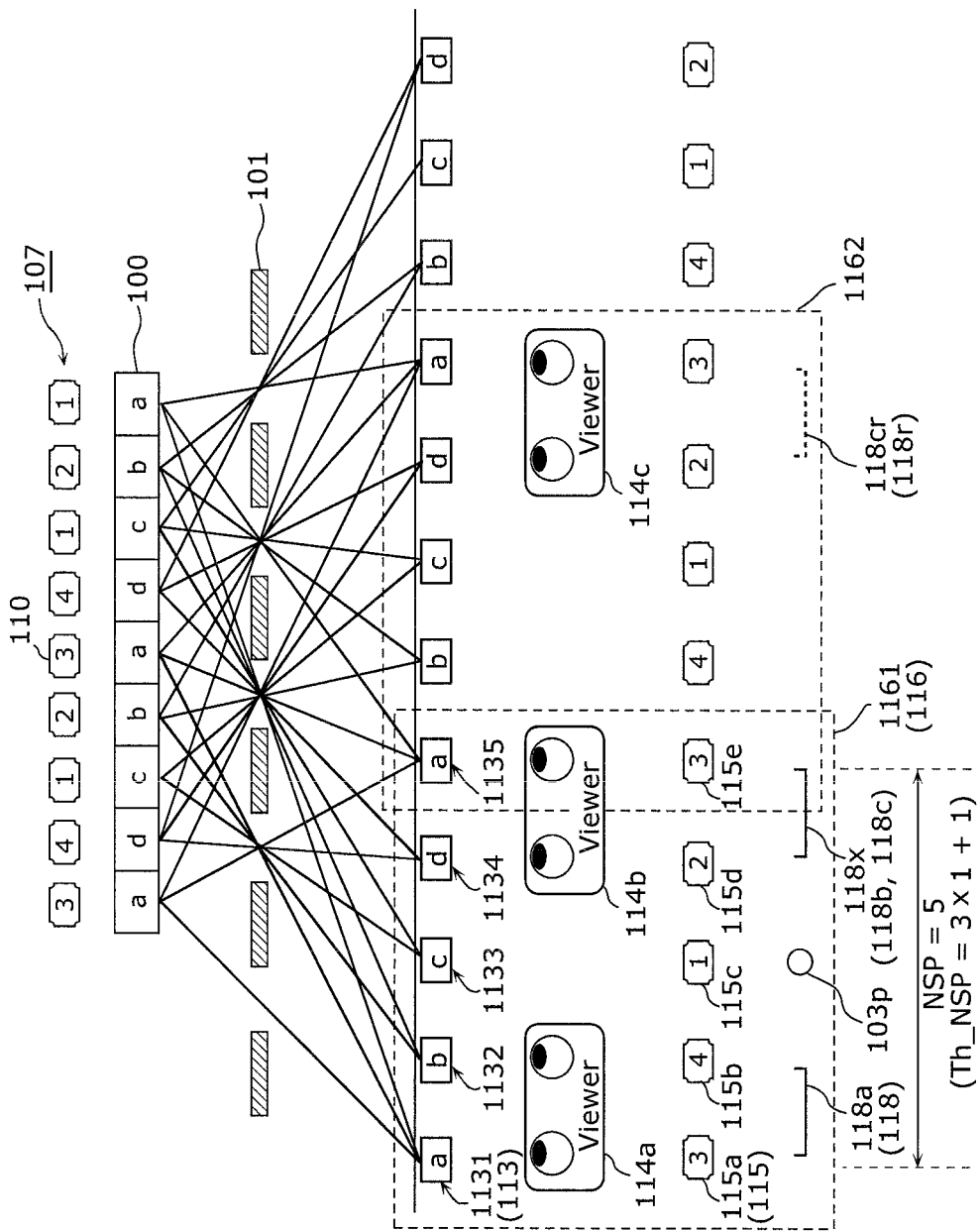
FIG. 20 is a diagram showing operations performed by the stereoscopic video display apparatus according to Embodiment 1.
Figure 21:
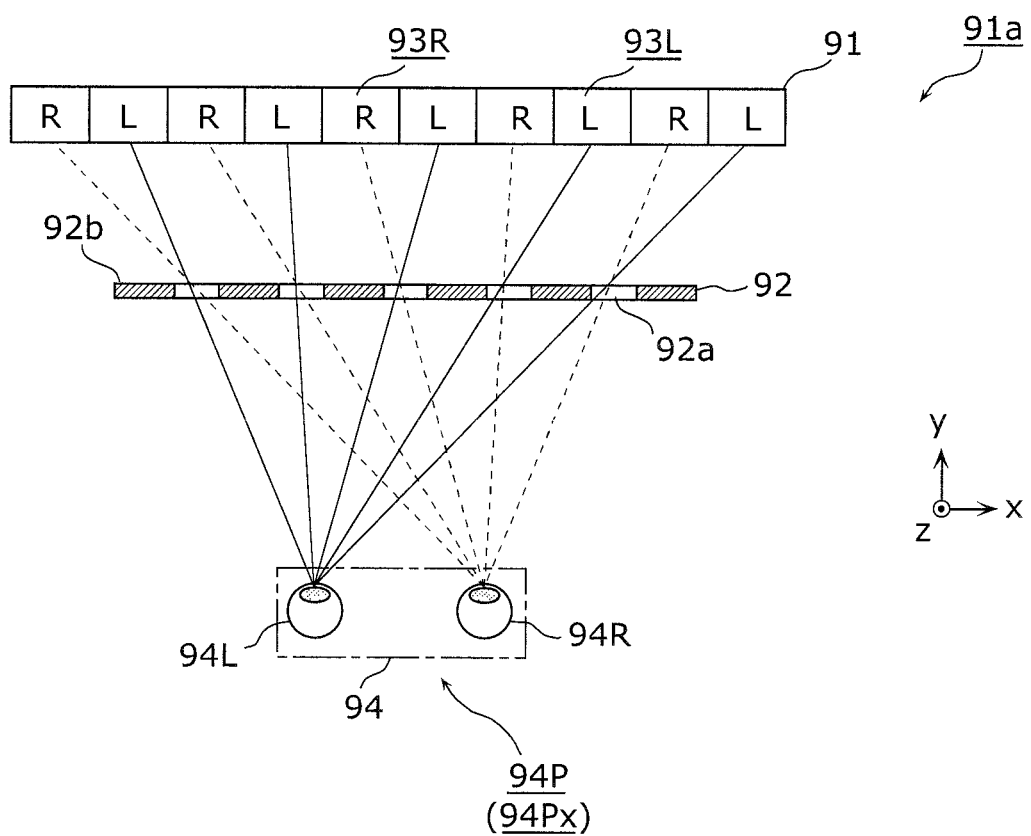
FIG. 21 is a diagram showing a structure of a conventional stereoscopic video display apparatus which performs barrier control using pairs of two parallax images.

In addition, in the case of FIG. 18, the arrangement as shown in FIG. 20 is also possible.

As mentioned above, the first step is to determine a blank parallax image display position between the first parallax image display position and the last parallax image display position among the positions of the eyes of plural viewers by searching the unit of processing 116 from the first position to the last position.

The parallax image numbers are discontinuous at the blank parallax image display position.

For this reason, the first parallax image 1 in the parallax image set OGn is displayed at the parallax image display position immediately after the blank parallax image display position.

Then, the remaining parallax images having parallax image numbers incremented by 1 with each of rightward shifts of the parallax image display positions are sequentially assigned to the corresponding parallax image display positions.

Optionally, it is possible that the parallax image number assigned to a second parallax image display position v1 located at the right end in the unit of setting 116 is also assigned to a first parallax image display position v1 located at the starting position in the unit of setting 116, and that the remaining parallax images starting with the parallax image located at the parallax image display position v2 are sequentially assigned to the parallax image display positions shifted one by one and lasting up to the position just before the blank parallax image display position.

The technique according to the present invention is intended to suppress pseudo stereoscopy by determining the starting position of the leftmost parallax image among the parallax images in a unit of setting and sequentially arranging the remaining parallax images in the right direction.

Alternatively, it is possible to determine the starting position of the rightmost parallax image among the parallax images in a unit of setting and sequentially arranging the remaining parallax images in the left direction.

In this case, the starting position of the rightmost parallax image is set at the parallax image display position immediately left to the starting position of the leftmost parallax image as defined in the former one of the above methods. In this case, the parallax image having the largest number is assigned to the rightmost parallax image display position, and the remaining parallax images having parallax image numbers incremented by 1 with each of leftward shifts in the parallax image display positions are sequentially assigned to the corresponding parallax image display positions. In addition, the parallax image number of the first parallax image display position v1 is also assigned as the parallax image number for the parallax image display position v1 located at the right end of the unit of setting 116. This alternative method also makes it possible to achieve suitable parallax image arrangement.

It is also possible to use another kind of feature quantity in the head detection method, and to employ another pattern matching method. For example, it is also possible to use as an evaluation function in matching a squared error with data stored in the template storage memory, and use the squared error. The data is obtainable according to a learning method in neural network etc.

It is to be noted that the stereoscopic video display apparatus 100s may be a television apparatus, a display which is for a personal computer and is used to display a stereoscopic video reproduced by the personal computer, or the like. Alternatively, the stereoscopic video display apparatus 100s may be a video game machine which displays a stereoscopic video as video of a video game. Alternatively, the stereoscopic video display apparatus 100s may be an advertisement display machine which displays an advertisement stereoscopic video, or any other kinds of display apparatuses.

Embodiment 2

Second embodiment describes an example of dividing each of predetermined position intervals between parallax images with reference to FIG. 9 to FIG. 13.

Specifically, Embodiment 2 describes an apparatus which displays a stereoscopic video by controlling the display positions of the parallax images on a display panel based on the detected head positions of viewers of stereoscopic video using parallax images whose number is obtained according to the number of viewers×n+1 where n denotes the number of position interval segments.

Figure 9:
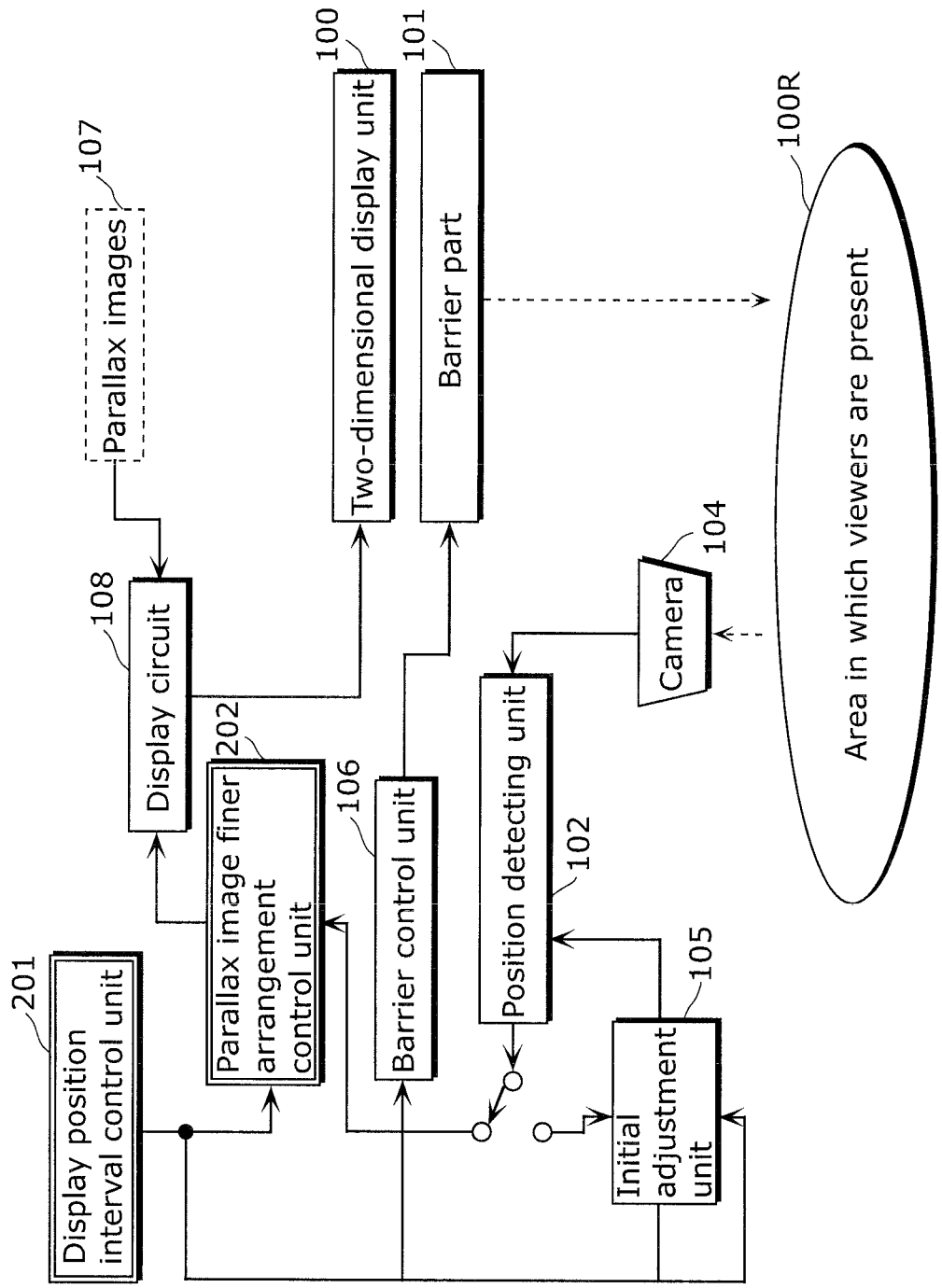
FIG. 9 is a diagram showing a structure of a stereoscopic video display apparatus according to Embodiment 2 of the present invention.
Figure 10A:
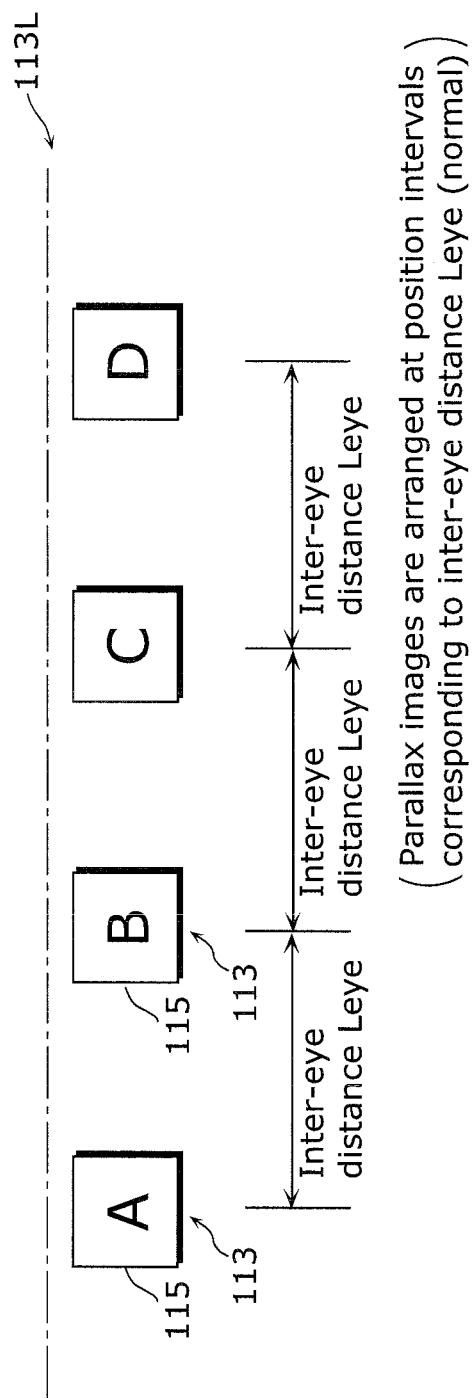
FIG. 10A is a diagram schematically shows operations performed by a display position interval control unit of the stereoscopic video display apparatus according to Embodiment 2 of the present invention.
Figure 10B:
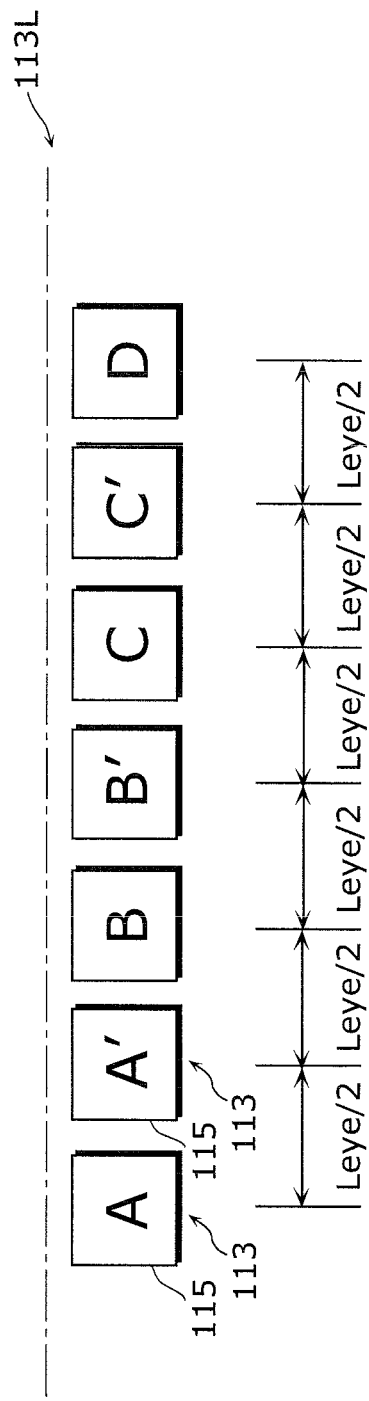
FIG. 10B is a diagram schematically shows operations performed by the display position interval control unit of the stereoscopic video display apparatus according to Embodiment 2 of the present invention.
Figure 11:
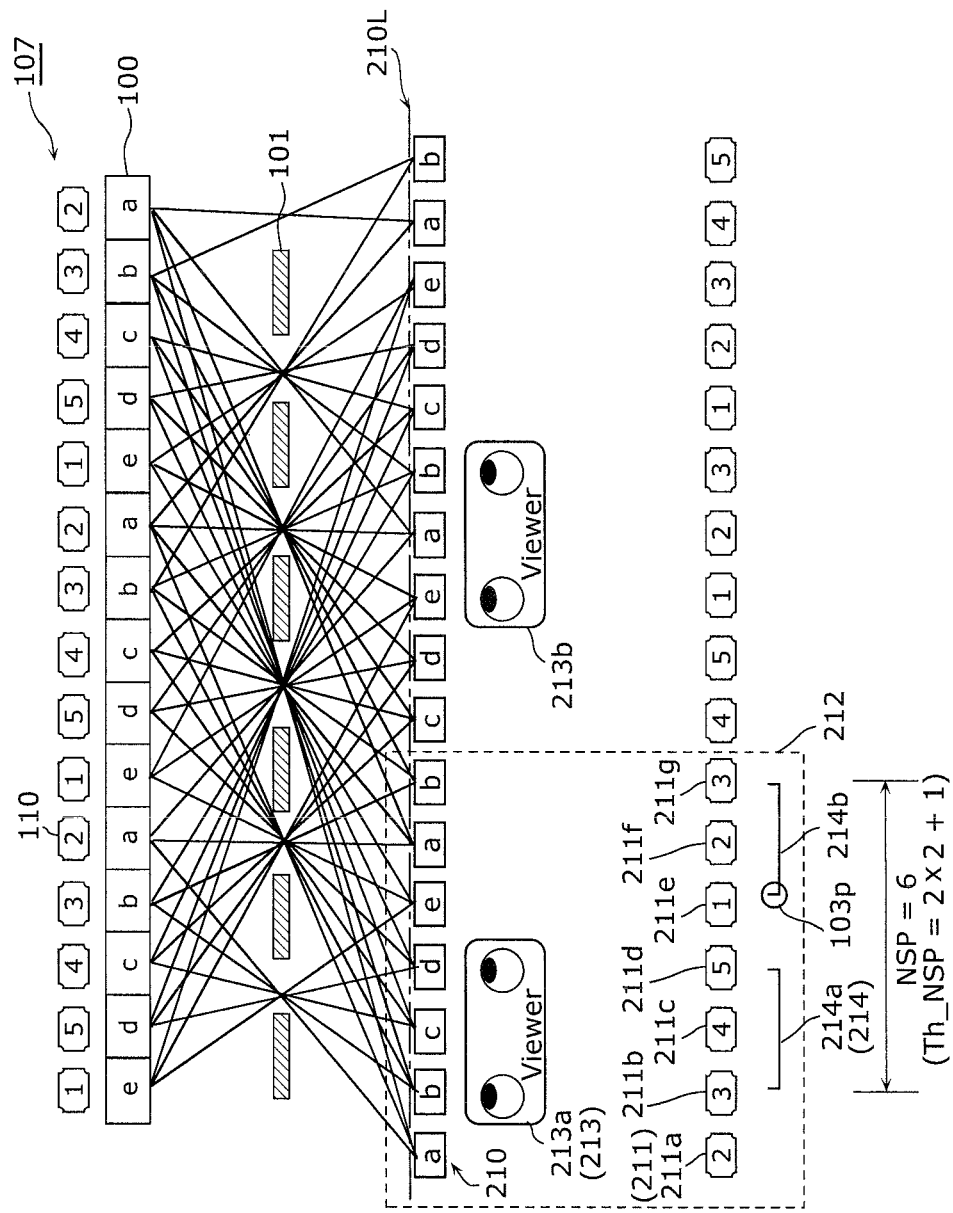
FIG. 11 is a diagram schematically showing processing performed by a parallax image arrangement control unit of the stereoscopic video display apparatus according to Embodiment 2 of the present invention (in the case where the number of viewers is two and the number of position interval segments m is 2)
Figure 12:
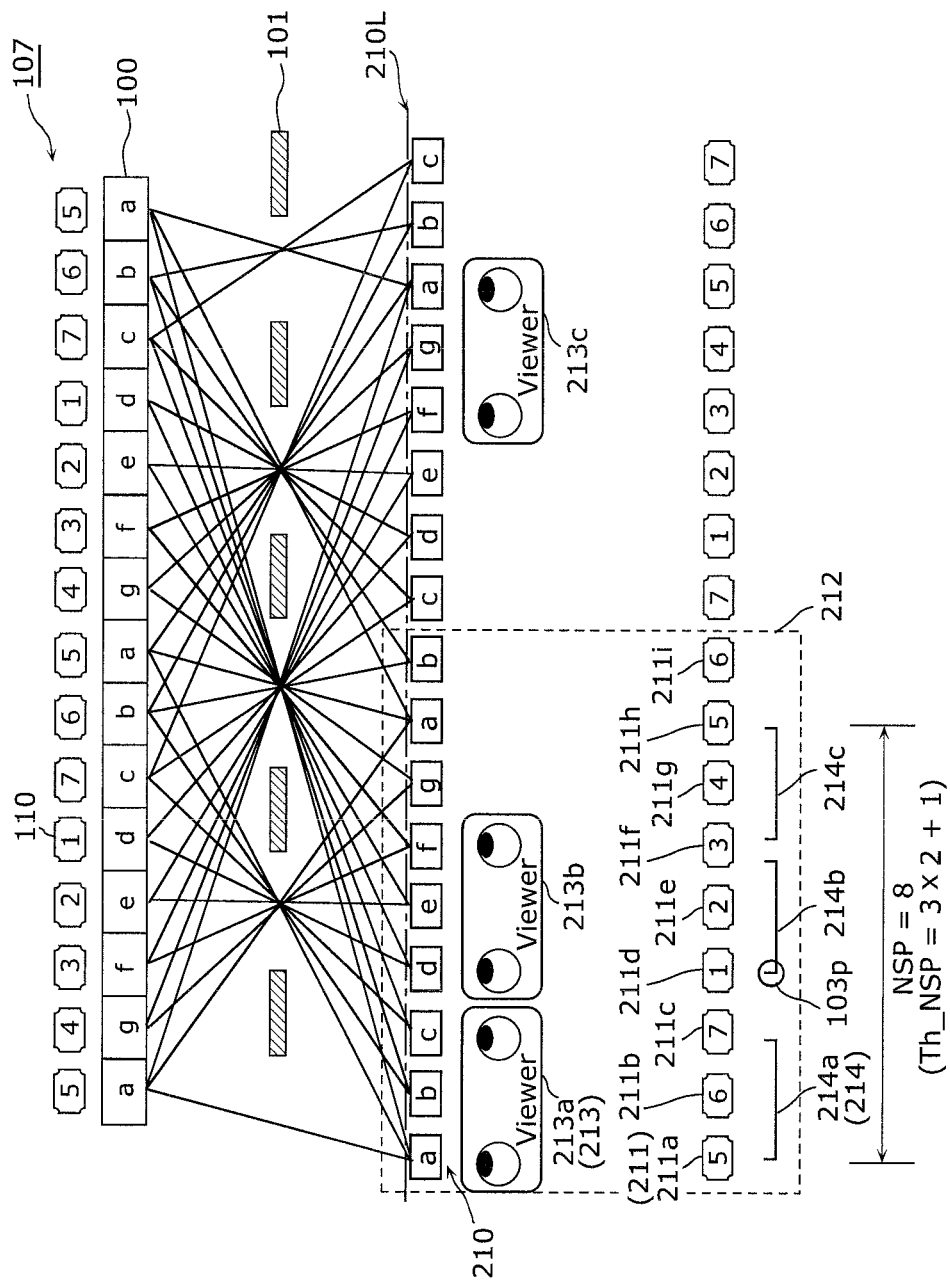
FIG. 12 is a diagram schematically showing processing performed by the parallax image arrangement control unit of the stereoscopic video display apparatus according to Embodiment 2 of the present invention (in the case where the number of viewers is three and the number of position interval segments m is 2)
Figure 13:
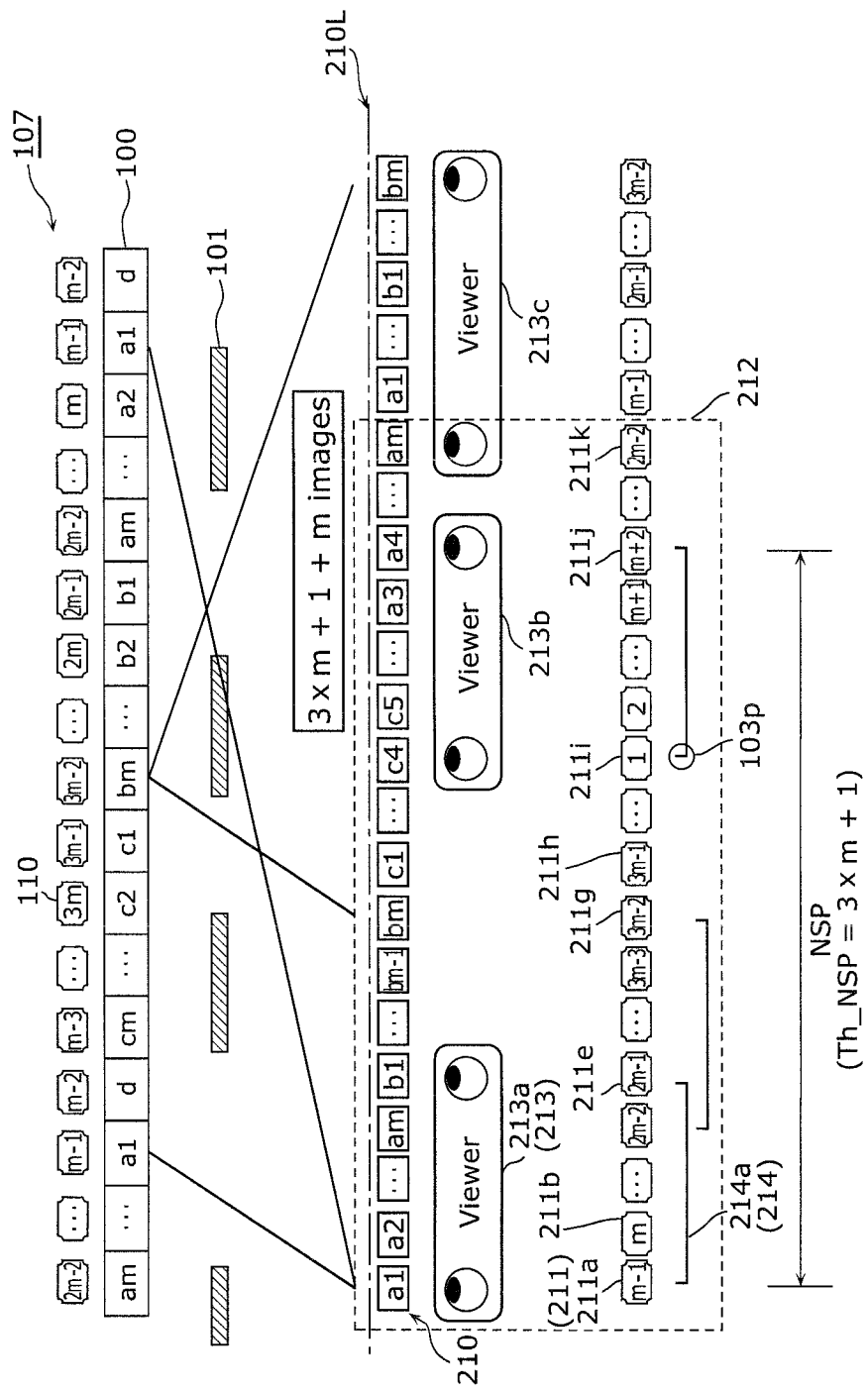
FIG. 13 is a diagram schematically showing processing performed by the parallax image arrangement control unit of the stereoscopic video display apparatus according to Embodiment 2 of the present invention (in the case where the number of viewers is three and the number of position interval segments is m)

FIG. 9 shows a configuration of a stereoscopic video display apparatus according to Embodiment 2. Each of FIGS. 10A and 10B shows processing performed by the display position interval control unit 201 which controls the display position intervals of the parallax images. FIG. 11 shows an example of parallax image arrangement control in the case where the number of viewers n is 2, and the number of position interval segments m is 2. FIG. 12 shows an example of parallax image arrangement control in the case where the number of viewers n is 3, and the number of position interval segments m is 2. FIG. 13 shows an example of parallax image arrangement control in the case where the number of viewers n is 3, and the number of position interval segments is m. In Embodiment 2, the structural elements other than the display position interval control unit 201 and the parallax image finer arrangement control unit 202 perform processing similar to the processing performed in Embodiment 1.

FIG. 9 is a diagram showing a structure of a stereoscopic video display apparatus.

The display position interval control unit 201 controls preset position intervals PLen between parallax images.

Figure 22:
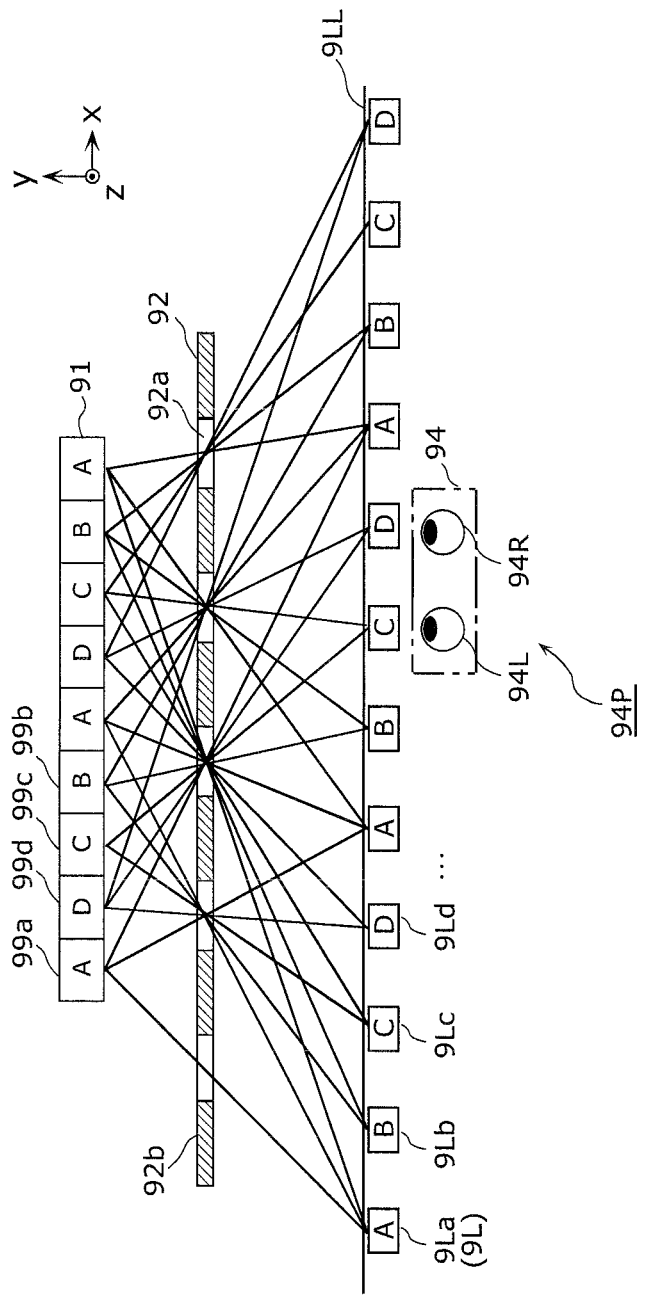
FIG. 22 is a diagram showing a structure of a conventional stereoscopic video display apparatus which performs barrier control using sets of four parallax images.
Figure 23A:
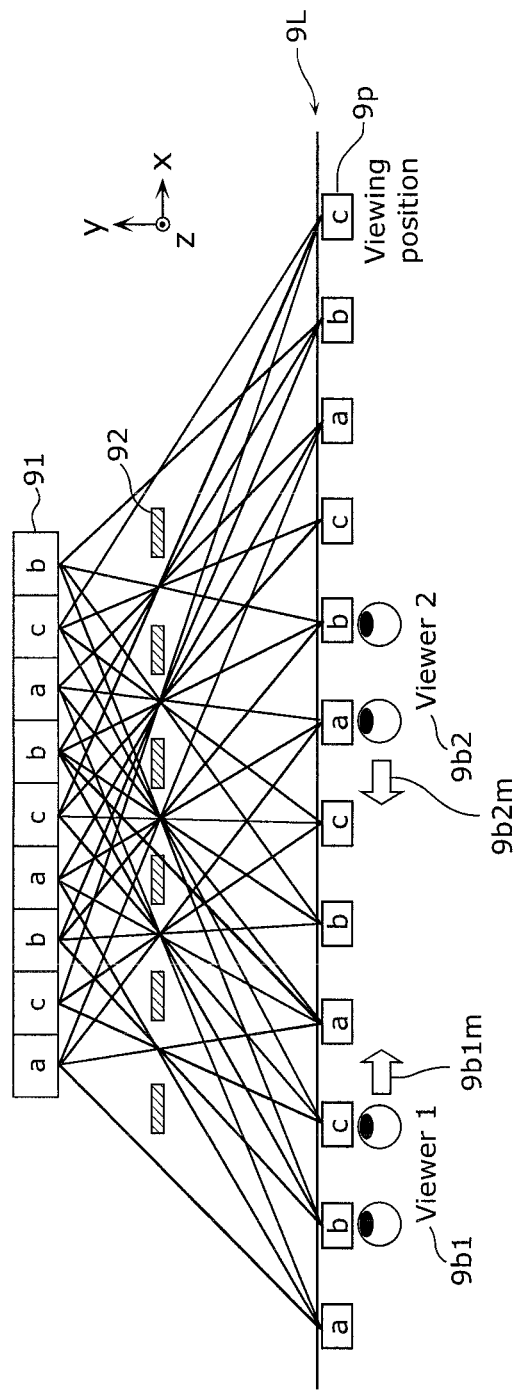
FIG. 23A is a diagram schematically illustrates a conventional pixel display scheme using sets of three parallax images for two viewers.

As shown in FIG. 22 and Embodiment 1, parallax images are displayed, at predetermined position intervals PLen, in a predetermined space located in a depth direction when seen from a display panel.

Normally, parallax images (a left-eye image and a right-eye image) respectively enter the left and right eyes of a viewer. Thus, the position interval PLen between these two parallax images is set correspondingly to the inter-eye distance Leye of the viewer.

Inter-eye distances vary among individuals, especially between adults and children. Here, it is assumed that such inter-eye distances approximately range from 60 mm to 70 mm.

FIG. 10A is a diagram showing a normal arrangement of parallax images.

FIG. 10B is a diagram showing an arrangement in the case of Leye/2.

FIG. 10A shows the aforementioned normal arrangement in which parallax images are arranged at corresponding parallax image display positions. Although FIG. 10A shows only a set of four parallax images A to D which are arranged sequentially from left to right according to the alphabetical order, other such sets are also arranged at both the sides of the shown set.

When the left-eye of a viewer is at one of these four positions and the right-eye of the viewer is at the position immediately next to the position for the left eye, the viewer can perceive a stereoscopic video made from two sets of parallax images (a left-eye image and right-eye image) that provide binocular parallax when displayed at the positions for the left and right eyes.

However, in the case where the left eye moves to a position between A and B in FIG. 10A, the left eye perceives a video which is a mixture of a parallax image A and a parallax image B.

In this case, the right eye moves to a position between B and C according to the movement of the left eye, and the right eye perceives a video which is a mixture of a parallax image B and a parallax image C.

As a result of the entrance of mixed videos to the eyes, the viewer cannot perceive a stereoscopic video at all or can perceive only a distorted video at best due to crosstalk phenomenon.

A conceivable countermeasure against this is to divide the inter parallax image display position intervals PLen as shown in FIG. 10B. In this case, PLen is calculated according to the following Expression 8.

(Math. 8)

$$PLen = \frac{Leye}{m} \qquad (8)$$

FIG. 11 is a diagram schematically showing the processing performed in Embodiment 2 (in the case where the number of viewers is 2 and the number of position interval segments m is 2).

FIG. 12 is a diagram schematically showing the processing performed in Embodiment 2 (in the case where the number of viewers is 3 and the number of position interval segments m is 2).

FIG. 13 is a diagram schematically showing the processing performed in Embodiment 2 (in the case where the number of viewers is 3 and the number of position interval segments is m).

Here, FIG. 11 shows an example where each of the position intervals are divided into two (the number of position interval segments m is 2), and thus PLen=Leye/2 is satisfied.

A parallax image A' is displayed at the middle of positions A and B, a parallax image B' is displayed at the middle of positions B and C, and a parallax image C' is displayed at the middle of positions C and D.

In this case, the parallax image finer arrangement control unit 202 controls parallax image arrangement on a two-dimensional display unit 100 based on the result of position detection by the position detecting unit 102.

Here is a case where the position detecting unit 102 determines a position movement of a viewer. In this case, as shown in FIGS. 11, 12, and 13, the parallax image finer arrangement control unit 202 may optimize the parallax image arrangement, or may optimize the parallax image arrangement, based on the result of position detection at a predetermined time point performed by the position detecting unit 102.

In addition, the position detecting unit 102 may optimize the parallax image arrangement, based on both the determination of presence or absence of a position movement of the viewer and the detection result at the predetermined time point.

The outline of the processing by the parallax image finer arrangement control unit 202 is shown in FIGS. 11, 12, and 13.

First, such an example in the case where the number of viewers n is 2 and the number of position interval segments m is 2 is described with reference to FIG. 11.

The definitions of the structural elements in the structure in FIG. 11 are similar to those in FIG. 2, 3, 4 in Embodiment 1. Compared to the case of FIG. 2, the inter parallax image display position interval PLen is the half. For this reason, in the structure, the display position of a parallax image is present between the display positions of parallax images for the left and right eye of each of a viewer 213*a* and a viewer 213*b*. A code 214*a* is one of codes 214 which denotes the viewing positions for the eyes of each viewer. For example, the left-eye position of the viewer 213*a* is the display position for a parallax image b, and the right-eye position of the viewer 213*a* is the display position for a parallax image d.

Here, the position interval between the two parallax images is the half of the inter-eye distance Leye. Thus, the required number of parallax images NumP is 5 according to NumP=(the number of viewers n×2+1)=5. The parallax images 110 displayed at the pixel sequence positions (a, b, c, d, and e) on the panel 100 are selected from among the set of five parallax images PG5={k|k a set of (1, 2, 3, 4, 5)} and then displayed.

Here, as in the case of Embodiment 1, it is assumed that pseudo stereoscopy occurs when the parallax image number of the parallax image that enters a right eye of a viewer is smaller than the parallax image number of the parallax image that enters a left eye of the viewer.

As shown in FIG. 11, the unit of setting 212 used for setting the display positions of the parallax images is composed of seven positions of a, b, c, d, e, a, and b which are the viewing positions 210.

The unit of setting 212 is determined considering that not only a combination of d and b but also a combination of e and b is possible.

In the unit of setting 212, the display positions 211*a*, 211*b*, 211*c*, 211*d*, 211*e*, 211*f*, and 211*g* respectively show the display positions of a first parallax image a, a first parallax image b, a parallax image c, a parallax image d, a parallax image e, a second parallax image a, and a second parallax image b.

For convenience of description, in FIG. 11 etc., the codes such as 211*a* indicating the display positions are shown comparatively lower part of the diagram.

A calculation is performed to obtain the number of parallax image display positions NSP between the first parallax image display position (position 211*b*) and the last parallax image display position (position 211*g*) among the positions of the eyes of the two viewers in this unit of setting 212.

The NSP in the case of FIG. 11 is 6.

This value is compared with the required number of parallax images NumP.

When an NSP corresponding to the difference between the first parallax image display position and the last parallax image display position among the positions of the eyes of the viewers in the unit of setting is larger than the NumP value, the parallax image numbers are discontinuous, that is, there is at least one blank parallax image display position which is not yet assigned to any of the eyes of the viewers.

In other words, when there is such a blank parallax image display position between the first and last parallax image display positions, the parallax image numbers are discontinuous.

To prevent such discontinuity, a first parallax image 1 in the parallax image set PG is displayed at a parallax image display position (position 211*e*) immediately after the blank parallax image display position.

Then, the remaining parallax images located at the right side of the parallax image display position 211*e* and having parallax image numbers sequentially incremented by 1 are assigned to the parallax image display positions shifted to the right up to the last parallax image display position b (position 211*g*) in the unit of setting 212. In this way, it is possible to achieve parallax image arrangement that does not cause any pseudo stereoscopy.

The parallax image display position a (viewing position 211*f*) and b (viewing position 211*g*) located at the right end portion of a first unit of setting 116 also function as the parallax image display position a (viewing position 211*f*) and b (viewing position 211*g*) in the starting positions of a second unit of setting 116. The parallax image numbers 2 and 3 assigned to the image display positions a and b at the right end portion are also assigned to parallax image display positions a and b located at the starting positions of the first unit of setting 116. Then, parallax image numbers sequentially incremented by 1 are assigned to the corresponding parallax image display positions, starting with the parallax image display position immediately after the parallax image display position (viewing position 211*c*) and ending with the parallax image display position 211*d* located immediately before the blank parallax image display positions (positions 211*d* to 211*e*). This makes it possible to achieve arrangement without pseudo stereoscopy also at the starting position of the unit of setting 212.

FIG. 11 shows such an arrangement. The position 103*p* marked with a circle in FIG. 11 shows the parallax image display position of the first parallax image 1 (image 1101) in the parallax image set PG.

In the case where NSP≤NumP is satisfied, all the positions from the first to last parallax image display positions among the parallax image display positions for the eyes of the viewers are already set for the eyes.

In this case, the first parallax image 1 in the parallax image set PG5 is placed at the position for the first eye. Then, parallax image numbers sequentially incremented by 1 are assigned to the corresponding parallax image display positions as the parallax image display positions shift to the right sequentially.

In this way, the parallax images up to the parallax image at the last parallax image display position b (211*g*) in the unit of setting are displayed without causing pseudo stereoscopy.

In this case, the parallax image display position a (viewing position 211*f*) and b (viewing position 211*g*) located at the right end portion of a first unit of setting 212 also function as the parallax image display position a (viewing position 211*f*) and b (viewing position 211*g*) located at the starting positions of a second unit of setting 212. The parallax image numbers 2 and 3 assigned to the image display positions a (viewing position 211*f*) and b (viewing position 211*g*) are also assigned to first parallax image display positions a (viewing position 211*f*) and b (viewing position 211*g*) located at the starting positions of the first unit of setting 212. Then, parallax image numbers incremented sequentially are assigned to the corresponding parallax image display positions up to the first parallax image display position 211*e* among the positions for the eyes of the viewers in the first unit of setting 212.

This makes it possible to achieve arrangement without pseudo stereoscopy also in this case.

FIG. 12 shows an example of optimum parallax image arrangement control in the case where the number of viewers n is 3 and the number of position interval segments m is 2.

In this case, the distance between mutually adjacent parallax images is the half of the inter-eye distance Leye. The required number of parallax images NumP is 7 according to NumP=(the number of viewers n×2+1)=7. The parallax images 110 which are displayed at the parallax sequence positions a, b, c, d, e, f, and g on the panel 100 are selected from among the set of seven parallax images PG7={k|k a set of (1, 2, 3, 4, 5, 6, 7)} and then arranged.

As shown in FIG. 11, the unit of setting 212 used for setting the display positions of the parallax images is composed of seven positions of a, b, c, d, e, f, g, a, and b which are the viewing positions 210.

The unit of setting 212 is determined considering that not only a combination of f and a but also a combination of g and b is possible.

In the unit of setting 212, the display positions 211*a*, 211*b*, 211*c*, 211*d*, 211*e*, 211*f*, 211*g*, 211*h*, and 211*i* respectively show the display positions of a first parallax image a, a first parallax image b, a parallax image c, a parallax image d, a parallax image e, a parallax image f, a parallax image g, a second parallax image a, and a second parallax image b.

The number of parallax image display positions NSP is 8 between the first parallax image display position (position 211*a*) and the last parallax image display position (position 211*h*) among the positions of the eyes of three viewers in the unit of setting 212.

This NSP is larger than the required number of parallax images NumP=7. This shows that there is a blank parallax image display position which is not yet assigned to any of the eyes of the viewers.

As in the case of FIG. 11, when there is a blank parallax image display position between the first parallax image display position (position 211*a*) and the last parallax image display position (211*h*) among the positions of the viewers, the parallax image numbers are discontinuous at the blank parallax image display position. Thus, the first parallax image 1 in the parallax image set PG is placed at the parallax image display position (position 211*d*) immediately after the blank parallax image display position.

Then, the remaining parallax images having parallax image numbers incremented by 1 with each of rightward shifts of the parallax positions are sequentially assigned starting from the position immediately after the position 211*d*.

In this way, the parallax images up to the last parallax image display position b (211*i*) in the unit of setting 212 are arranged without causing pseudo stereoscopy.

In FIG. 12, the parallax image display position a (viewing position 211*h*) and b (viewing position 211*i*) located at the right end portion of a first unit of setting 212 also function as the parallax image display position a (viewing position 211*h*) and b (viewing position 211*i*) located at the starting positions of a second unit of setting 212. The parallax image numbers 5 and 6 assigned to the image display positions a (viewing position 211*h*) and b (viewing position 211*i*) are also assigned to first parallax image display positions a (viewing position 211*a*) and b (viewing position 211*b*) located at the starting positions of the first unit of setting 116. Then, 7 obtained by adding 1 to the parallax image number 6 assigned to the parallax image display position 211*b* is assigned to the immediately succeeding parallax image display position (position 211*c*).

This makes it possible to achieve arrangement without causing pseudo stereoscopy between the parallax image display positions at the both ends of the unit of setting 212.

The parallax image display position 203*p* denoted as a circle in FIG. 12 denotes the position corresponding to the parallax image display position number indicating the display position of the first parallax image 1 in the parallax image set PG.

FIG. 13 shows an example of an optimum parallax image arrangement control in the case where the number of viewers n is 3 and the number of position interval segments is m.

Here, the distance between mutually adjacent parallax images equals to the inter-eye distance Leye/m. The required number of parallax images NumP is obtained according to NumP=(the number of viewers 3×m+1). The parallax images 110 which are displayed at the pixel sequence positions a1, a2, ..., am, b1, b2, ..., bm, c1, c2, ..., cm, and d on a panel 100 are selected from among the set of (3 m+1) parallax images PGm={k|k a set of (1, 2, 3, 4, 5, 6, 7, ..., 3 m+1)} and arranged.

As shown in FIG. 13, the unit of setting 212 in the arrangement of parallax images to be displayed is composed of (3 m+m+1) positions which are a1, a2, ..., am, b1, b2, ..., bm, c1, c2, ..., cm, and d) which are the viewing positions 210.

A calculation is made to obtain the number of parallax image display positions NSP between the first parallax image display position (position 211*a*) and the last parallax image display position (position 211*i*) among the positions of the eyes of the three viewers, and the calculated NSP is compared with the required number of parallax images NumP=3 m+1.

In the case of FIG. 13, NSP>NumP is satisfied. Thus, there are blank parallax image display positions between the first parallax image display position and the last parallax image display position among the positions of the eyes of the viewers. This means that the parallax image numbers are discontinuous at the blank parallax image display positions. Thus, the first parallax image 1 in the parallax image set is placed at the parallax image display position (position 211*i*) immediately after the blank parallax image display positions.

Then, the remaining parallax images having parallax image numbers incremented by 1 with each of rightward shifts of the parallax image display positions are sequentially assigned to the succeeding parallax image display positions.

In this way, the parallax images up to the parallax image at the last parallax image display position am (211*k*) in the unit of setting 212 are displayed without causing pseudo stereoscopy.

The parallax image numbers of parallax image display positions a1 to am at the right end portion of the unit of setting 212 are also assigned to the parallax image display positions a1 to am at the starting positions of the first unit of setting 212. Then, parallax image numbers are sequentially incremented by 1 and assigned to the parallax image display positions starting with the immediately succeeding parallax image display position b1 (position 211*e*) and ending with the parallax image display position bm (position 211h), as in the cases of FIGS. 10A and 10B, and FIG. 11.

This makes it possible to achieve arrangement without causing pseudo stereoscopy between the parallax image display positions at the both ends of the unit of setting 212.

As with the case of Embodiment 1, Embodiment 2 shows an example where viewer's eyes are at specific positions with reference to FIG. 11 to FIG. 13. However, it is possible to perform parallax image arrangement control according to a similar manner also in the case where viewer's eyes are at other possible positions.

Here, a parallax image display pattern is repeated, and thus there is a case where an eye of a viewer is at a first display position having a parallax image number and an eye of another viewer is at a second display position having the same parallax image number (taking an example of FIG. 12, a viewer 213a is located correspondingly to first parallax image display positions a and c and a viewer 213c is located correspondingly to second parallax image display positions a and c).

In this case, as with Embodiment 1, NSP<NumP is satisfied although a unit of setting includes a blank parallax image display position which does not correspond to any of the eyes of the viewers between the first parallax image display position and the last parallax image display positions among the positions of the eyes of the viewers because some parallax image display positions (viewing positions) having the same parallax image numbers are respectively set for plural viewers, between the first parallax image display position and the last parallax image display position among the positions of the eyes of the viewers in a unit of setting.

Also in this case, it is possible to use a method of placing the first parallax image 1 in the parallax image set PG7 for the first eye, and then assigning parallax images having parallax image numbers incremented by 1 with each of rightward shifts of the parallax image display positions to the corresponding parallax image display positions starting with the immediately succeeding position.

In an exemplary case where the parallax image number 1 is assigned to a parallax image display position g located at the right end of a first parallax image set PG7 which also functions as a first parallax image display position g located at the starting position of a second parallax image set PG7, it is possible to prevent pseudo stereoscopy from occurring, for example, in the case where the eyes of a viewer are at a parallax image display position f (parallax image display position 211f) and a second parallax image display position a (parallax image display position 211h) and the case where the eyes of a viewer are at a parallax image display position e (parallax image display position 211e) and a parallax image display position g (parallax image display position 211g).

Further, the procedure shown here is also applicable in the case where the number of viewers n is 4 although such a case is not described.

The following describes the rule for an optimum arrangement control of parallax images 110 to be displayed at pixel sequence positions on the panel 100 in the case where the number of viewers is n and the number of position interval segments is m. Here, n denotes the number of viewers, and m denotes the number of position interval segments.

(Procedure 1) A unit of setting 212 for the arrangement of parallax images to be displayed is set. The unit of setting 212 is composed of the positions for the eyes of the viewers. At this time, a set of viewing positions 214 for the eyes of viewers is set.

A calculation is performed to obtain the number of parallax image display positions NSP between the first parallax image display position and the last parallax image display position of the eyes of the viewers in the unit of setting 212.

In addition, Th_NSP is calculated based on the number of viewers n and the number of position interval segments m according to Expression 9.

Here, although the value Th_NSP equals to the value of the required number of parallax images NumP, Th_NSP is redefined as a reference value for the arrangement control.

(Math. 9)

$$Th\_NSP = NumP = n \times m + 1 \tag{9}$$

(Procedure 2) In the case where NSP≤Th_NSP is satisfied, all the first to last parallax image display positions are assigned to the eyes of the viewers. Thus, the parallax image 1 in the parallax image set PG is set for the first parallax image display position, and parallax images having parallax image numbers incremented by 1 are set for the following parallax image display positions.

Here, as for parallax image display positions (viewing positions) a1, ... am, the same parallax image numbers are assigned to parallax image display positions for the same parallax images located at the starting positions of the unit of setting 212.

Then, parallax image numbers incremented by 1 are assigned to the parallax image display position after the parallax image display position am to the parallax image display position immediately before the first parallax image display position among the positions for the eyes of the viewers in the unit of setting 212.

(Procedure 3) In the case where NSP>Th_NSP is satisfied, the parallax image numbers are discontinuous between the first to last parallax image display positions for the eyes of the viewers. In other words, blank parallax image display positions are present therebetween.

Thus, the parallax image 1 in the parallax image set PG is set for the parallax image display position (position 103p) located immediately after the first blank parallax image display position. Then, parallax image numbers sequentially incremented by 1 are set for the following parallax image display positions.

Here, as for viewing positions a1, ... am, the same parallax images are assigned to positions located at the starting positions of the unit of setting 212. Then, parallax image numbers incremented by 1 are assigned to the area immediately left to the blank parallax image display positions.

By dividing the position interval between the mutually adjacent parallax image display positions in this way makes it possible to reduce the size of the area in which crosstalk occurs.

Furthermore, by optimizing the parallax image arrangement on the display panel makes it possible to suppress pseudo stereoscopy even when setting, to 1/m with respect to the inter eye distance, the position interval between the parallax image display positions in the case where the number of viewers is n.

As with Embodiment 1, this rule is applicable also to the case where some parallax image display positions (viewing positions) having the same parallax image number are respectively set for plural viewers, between the first to last parallax image display positions for the eyes of the viewers in the unit of setting.

In the case of dividing the position interval between the parallax image display positions to position interval segments each smaller than 1/m with respect to the maximum number of viewers nmax, (nmax×m+1) number of parallax images are prepared. The position interval between the parallax image display positions is divided into m position interval segments by controlling the arrangement of the parallax images to be displayed according to the aforementioned rule at the time when presence of a position movement is determined based on a result of detection of the head of at least one of the viewers. This shows that the present invention provides an advantageous effect of allowing the viewers to watch a stereoscopic video without causing pseudo stereoscopy even when plural viewers ranging from 3 to nmax watch the stereoscopic video at the same time.

Embodiment 1 corresponds to the case where the number of position interval segments m in Embodiment 2 is 1.

Here, faster processing is possible by preparing and using a look up table (LUT) of rules for parallax image arrangement control.

It is also possible to perform such processing by using predetermined conversion functions representing the rules for parallax image arrangement control and cause a CPU or a GPU to execute the conversion functions.

Embodiment 2 describes the same case as a case where the number of position interval segments m is 1 in Embodiment 1. Processing performed in Embodiment 2 is the same as the processing performed in Embodiment 2 the same when m=1. Accordingly, it is possible to use a method of (i) determining blank parallax image display positions between the first to last parallax image display positions among the parallax image display positions for the eyes of the viewers in the unit of setting 212 by searching the unit of setting 212 starting with the starting position, and (ii) arranging, at the parallax image display position immediately after the last blank parallax image display position, a parallax image 1 appearing firstly in a range after the last blank parallax image display position in the parallax image set.

However, in the cases other than the case where m is 1, it is impossible to use the method of determining the blank parallax image display positions between the first to last parallax image display positions among the parallax image display positions for the eyes of the viewers in the unit of setting 212 by searching the unit of setting 212 starting with the starting position, and arranging, at the parallax image display position immediately after the last blank parallax image display position, the parallax image 1 appearing firstly in the range after the last blank parallax image display position in the parallax image set.

In an example of FIG. 11, according to such a simple method, parallax images are arranged according to the following order of 1, 2, 3, 4, 5, and 1 in the unit of setting 212. In this case, the parallax image 4 and the parallax image 1 are respectively displayed for the left and right eye of a viewer 213b, causing pseudo stereoscopy.

In this case, as with Embodiment 1, it is good to determine the rightmost parallax image display position as the starting point for parallax image arrangement in a unit of setting, and sequentially display the parallax images in the unit of setting in the left direction. In this case, the rightmost parallax image display position as the starting point is set at the position immediately left to the leftmost parallax image display position in another unit of setting. In this case, the parallax image having the largest parallax image number is assigned at the rightmost parallax image display position, and the remaining parallax images having parallax image numbers decremented by 1 with each of leftward shifts of the parallax image display positions are sequentially assigned to the corresponding parallax image display positions. It is also possible to achieve such parallax image arrangement, by assigning the parallax image number of the starting parallax image display position in the unit of setting 212 also to the rightmost parallax image display position in the unit of setting 212.

Here, faster processing is possible by preparing a look up table (LUT) of rules for parallax image arrangement control. Alternatively, it is possible to perform such processing by using predetermined conversion functions representing the rules for parallax image arrangement control and cause a Central Processing Unit (CPU) or a Graphics Processing Unit (GPU) to execute the conversion functions.

Embodiment 3

With reference to FIG. 14 to FIG. 16A and FIG. 16B, Embodiment 3 describes an apparatus which displays a stereoscopic video by generating a parallax image set according to the number of viewers, by firstly preparing only a set of a left-eye image L and a right-eye image R in the set, and then performing interpolation using the left- and right-eye images.

Figure 14:
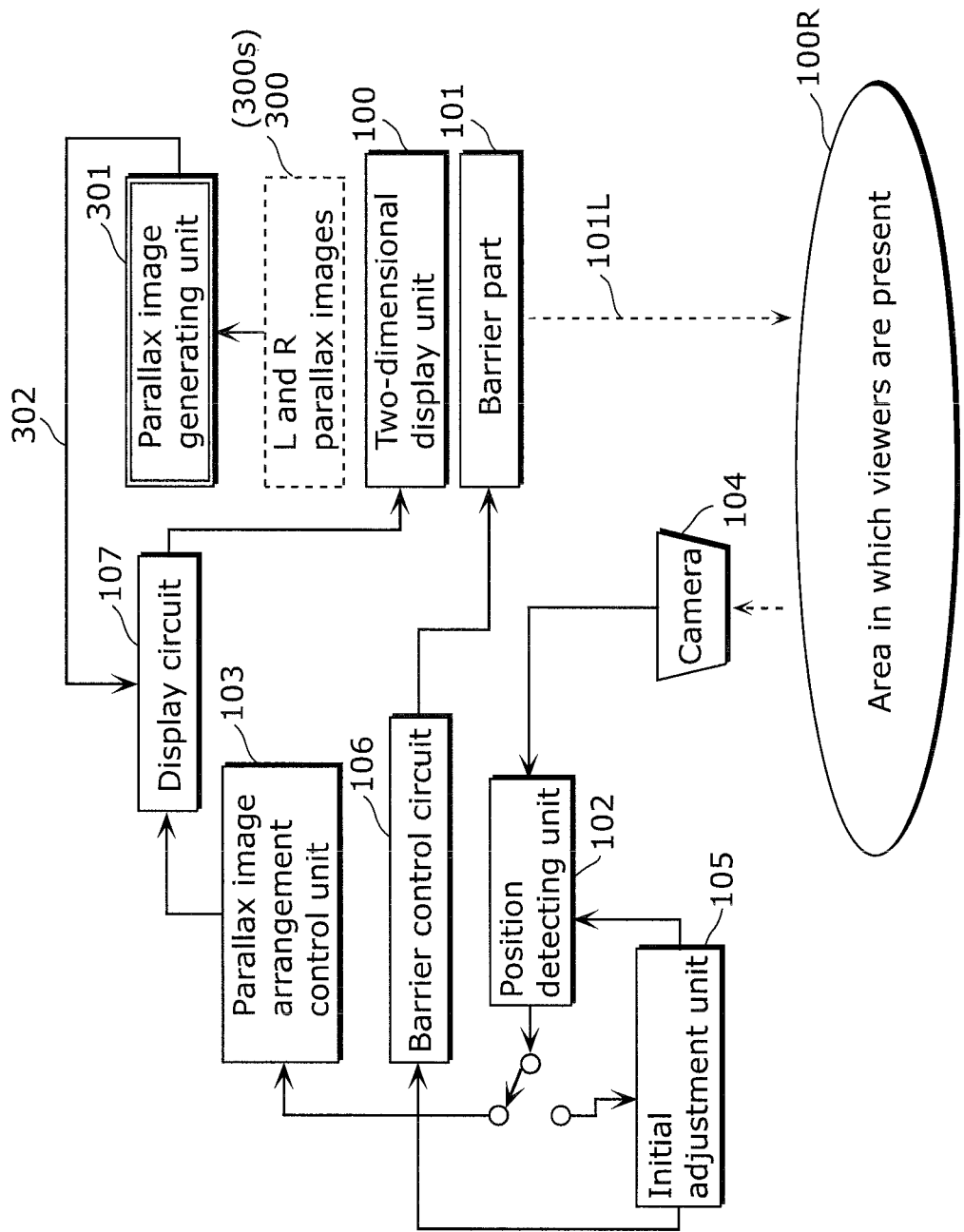
FIG. 14 is a diagram showing a structure of a stereoscopic video display apparatus according to Embodiment 3 of the present invention.
Figure 15:
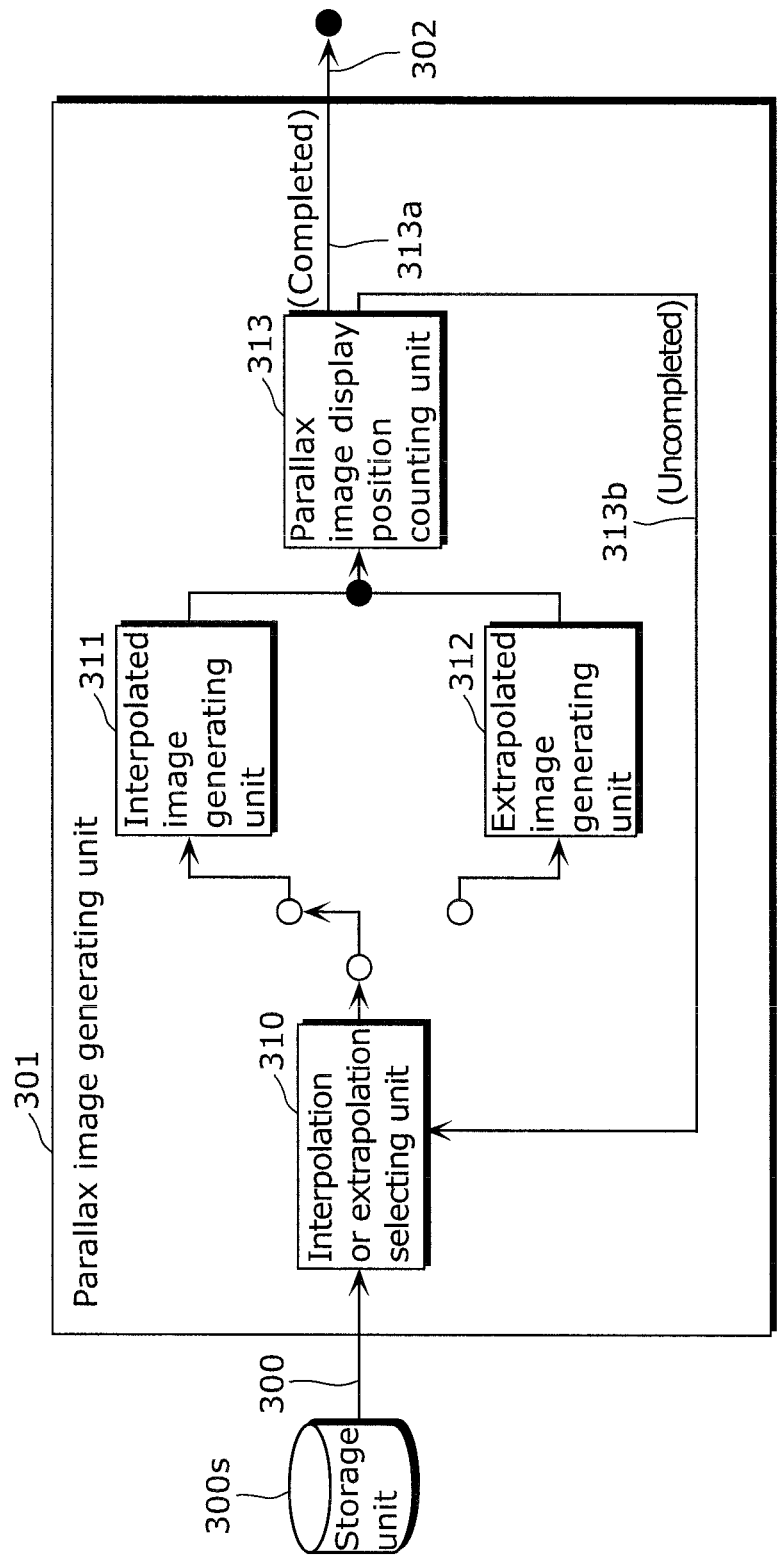
FIG. 15 is a diagram showing a structure of a parallax image generating unit of the stereoscopic video display apparatus according to Embodiment 3 of the present invention.

FIG. 14 shows a structure of a stereoscopic video display apparatus according to Embodiment 3. FIG. 15 shows a structure of the parallax image generating unit 301 inside the stereoscopic video display apparatus according to Embodiment 3. As shown in FIG. 14, the stereoscopic video display apparatus according to Embodiment 3 includes the parallax image generating unit 301 which receives, as inputs, L and R parallax images instead of a plurality of parallax images used in Embodiment 1 generates predetermined parallax images.

Thus, the parallax image generating unit 301 is also applicable to Embodiment 2. The other structural elements are the same as in Embodiment 1 and/or Embodiment 2.

Embodiment 3 is characterized by eliminating the need to prepare in advance a plurality of parallax images required according to the number of viewers, and reliably generating the required number of parallax images by interpolation using a set of a left-eye parallax image L and a right-eye parallax image R which have a binocular parallax therebetween.

This processing is performed by the parallax image generating unit 301 in FIG. 15.

FIG. 15 is a diagram showing a structure of the parallax image generating unit 301.

As shown in FIG. 15, the parallax image generating unit 301 includes an interpolation or extrapolation selecting unit 310, an interpolated image generating unit 311, an extrapolated image generating unit 312, and a parallax image display position counting unit 313.

Figure 16B:
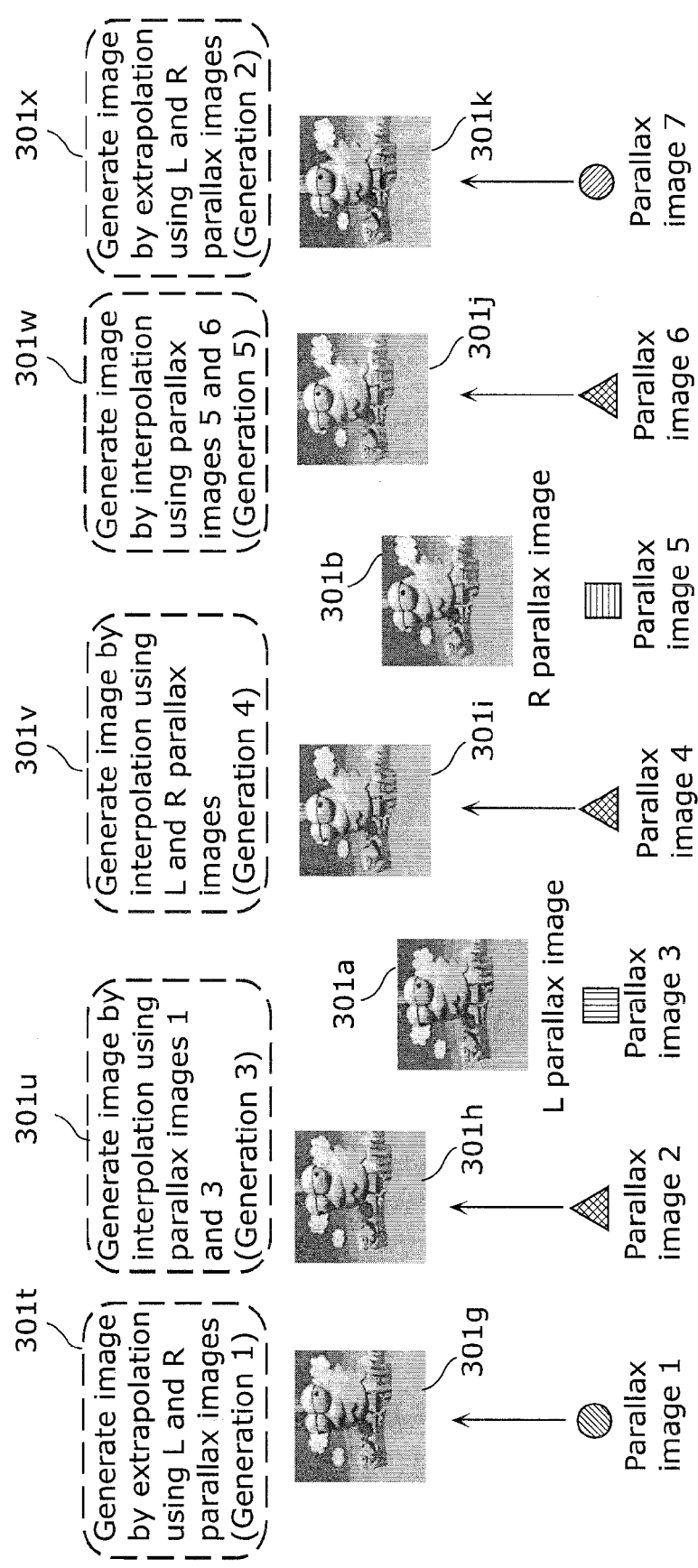
FIG. 16B is a diagram showing a parallax image generation procedure taken by the stereoscopic video display apparatus according to Embodiment 3 of the present invention.

Each of FIG. 16A and FIG. 16B is a diagram schematically showing how parallax images are generated by extrapolation and/or interpolation.

FIG. 16A shows an example of extrapolation as a combination with the processing in Embodiment 1. FIG. 16B shows an example of interpolation and extrapolation as a combination with Embodiment 2.

First, the interpolation or extrapolation selecting unit 310 selects extrapolation or interpolation to generate extrapolated or interpolated parallax images, based on a current parallax image or image set at the time of the selection.

Here, a description is given of a case as in Embodiment 1 where the required number of parallax images is the value obtained according to (the number of viewers n+1)=NumP as in FIG. 16A and Expression 7. In this case, the interpolation or extrapolation selecting unit 310 selects extrapolation (processing 301q) to generate a parallax image (for example, an image 301c) next to L and R parallax images (an image 301a and an image 301b). More specifically, the extrapolated image generating unit 312 generates the parallax image (the image 301c corresponding to a parallax image 1) by extrapolation.

Then, the parallax image display position counting unit 313 determines whether the number of parallax images is the required number Nump. In the case where it is determined that the required number of parallax images is already prepared, the processing by the parallax image generating unit 301 is completed.

In the opposite case where it is determined that the required number of parallax images is not yet prepared, a return is made to the selection by the interpolation or extrapolation selecting unit 310. The interpolation or extrapolation selecting unit 310 selects interpolation or extrapolation for a next parallax image or image set.

For example, in the case shown in FIG. 16A, NumP=4 when the number of viewers is 3. Thus, not only the parallax image 1 (image 301c) but also a parallax image 4 (image 301d) is generated by extrapolation.

The above example of generating parallax images by extrapolation is shown as an example of increasing an effect of generating interpolated parallax images having less flatness or blur and thereby generating a higher-quality stereoscopic video.

Next, a description is given of the opposite case of a combination with the processing in Embodiment 2 where the required number of parallax images is the value obtained according to (the number of viewers n×2+1)=NumP as shown in FIG. 16B and Expression 9. In this case, extrapolation using parallax images 301a and 301b is firstly performed to generate each of two parallax images (an image 301g and an image 301k) (See the processing 301t and 301x).

Then, interpolation using the four parallax images (parallax images 301a, 301b, 301t, and 301x) is performed to generate additional parallax images (here, three parallax images 301i, 301h, and 301j) (See processing 301u and 301w).

In the case where more parallax images are necessary, two parallax images are generated by further extrapolation, and then other two parallax images are generated by further interpolation.

For example, in the case where the number of viewers is 3 as shown in FIG. 16B, the required number of parallax images is 7.

Here, L and R parallax images (an image 301a corresponding to a parallax image 3 and an image 301b corresponding to a parallax image 5) are extrapolated to generate each of a parallax image 1 (an image 301g) and a parallax image 7 (an image 301k).

Next, interpolation using the L and R parallax images and the parallax images 1 and 7 is performed to generate three parallax images 2, 4, 5 (corresponding to images 301i, 301h, 301j, respectively).

In the case of a scheme in FIG. 16B, extrapolation and interpolation is combined in order to comparatively reduce extrapolation and thereby suppress crosstalk and maintain the crosstalk suppression effect, the parallax images are displayed apart from adjacent parallax images at position intervals corresponding to ½ of the value according to the corresponding one of inter eye distances Leye ranging from 60 mm to 70 mm.

In this way, it is possible to prepare only a set of L and R parallax images essential to prepare a required number of parallax images and generate the other required number of parallax images using the L and R parallax images, without preparing in advance a large number of parallax images required according to the number of viewers n. In this way, parallax image generation processing is simplified.

In the above-described case in FIG. 16B as a combination with the processing in Embodiment 2, the position intervals between mutually adjacent parallax images correspond to ½ of the value according to the corresponding inter eye distances Leye ranging from 60 mm to 70 mm. This is true when the number of position interval segments m is 2.

As in the above-described Embodiment 2, the case where the number of position interval segments of the position intervals between parallax image display positions is m corresponds to the case of dividing the position intervals into m position interval segments to reduce crosstalk, and thus the required number of parallax images is the value obtained according to NumP=(the number of viewers n×the number of position interval segments m+1).

In this case, the parallax image generating unit 301 performs extrapolated or interpolated parallax image generation process several times obtained according to Nump−2.

Normally, it is difficult to capture a great number of binocular parallax images even using a camera having two lenses arranged in parallel, and it is much more difficult to prepare and use a special image capturing device having two or more parallel lenses required according to the number of parallax images.

Conceivable additional processes include: (i) estimating the distance between L and R parallax images starting from one or both of them, and generating images in an arbitrary parallax direction, based on the result of the estimation, and (ii) setting the position, angle, and focus position of a camera, and generating parallax images using a computer graphics (CG). Such additional processes can be reduced according to the technique(s) of the present invention.

In the case where the required number of parallax images is (the number of viewers n+1) as in FIG. 16A, extrapolation is always performed to generate the required number of parallax images. However, it is also possible to perform only interpolation or combine extrapolation and interpolation as in FIG. 16B. Likewise, it is also possible to perform only interpolation or only extrapolation in the case of FIG. 16B, other than the combination of interpolation and extrapolation performed in the case of FIG. 16B.

It is also possible to perform interpolation and/or extrapolation of parallax images using prepared conversion functions. In addition, it is also good to estimate such conversion functions by performing statistical analysis of parallax images available at the time of the estimation. Such statistical analysis is represented by multivariate analysis, linear approximation, etc. It is also possible to generate new parallax images using the estimated conversion functions. In this case, it is only necessary to perform parallax image interpolation and/or extrapolation processes as described above with reference to FIG. 16B etc. until the predetermined number of parallax images required for the estimation using the conversion functions are generated.

In the case where the number of parallax images is comparatively large (changes significantly) according to an increase in the number of viewers, it is desirable to cause the initial adjustment unit 105 to adjust parameters such as the pitches of the inter parallax barriers, the pitches between the centers of the lenses of a lenticular, etc. However, in the case where the number of parallax images increases slightly, for example, by one or two images, it is possible to leave such parameters unchanged assuming that the changes in the widths of the pitches, etc. are very small and thus negligible.
(Variation)

The two-dimensional display unit 100 which displays stereoscopic images and is included in the stereoscopic video display apparatus according to the techniques in the above-described embodiments may be a liquid crystal panel using a back light source, or may be a PDP, an organic EL panel, or the like which emits light. In other words, any display units which can display pixel sequences of parallax images are applicable as the two-dimensional display unit 100.

The head detecting unit 180 performs stereoscopic measurement of the heads of viewers using a single camera image in the above exemplary case. However, the head detecting unit 180 may perform stereoscopic measurement of the heads of viewers using two or more camera images, which results in an increase in the position detection accuracy.

Examples of approaches other than the approach using images which can be taken by the head detecting unit 180 includes (i) a Time of Flight (TOF) method of measuring the distance to a target object (a viewer of a stereoscopic video) by irradiating an illumination light such as a LED light source onto the target object and measuring the time of flight required for the return of the light, (ii) a wired-connection approach for performing three-dimensional position measurement using electro-magnetic power, etc.

Alternatively, it is possible to take an approach of associating a body part of a viewer with a predetermined test pattern, capturing images of the viewer such that the test pattern is included in the images, and geometrically measures the position of the viewer, based on the size of the body portion with the test pattern, variation in the moire pattern of pixels in the images, etc.

In the above exemplary cases, the heads of the viewers are detected for the detection of the eye positions. However, it is possible to detect the whole bodies of the viewers or the face parts such as pupils or eye portions for the detection of the eye positions.

It is also possible to calculate and control the arrangement of pixel sequences of a plurality of parallax images in real time using a CPU, a GPU, or the like, based on the head positions. Alternatively, it is also possible to select, in a prepared look up table (LUT), information for such pixel sequence arrangement control and perform the control using the selected information.

The above descriptions are given assuming that the barrier formation positions and the barrier pitches (intervals) are fixed at the initially adjusted values. However, it is possible to actively change the barrier positions and pitches based on the head positions. In the latter case, devices (such as a TFT liquid crystal panel) which can block or pass light (change the transmittance of the light) with an application of voltage or the like are used as such barriers. In this case, the use of such devices makes it possible to apply the techniques of the present invention to the case where the positions of a plurality of viewers are changed simultaneously in the depth direction when seen from a display panel.

The techniques of the present invention are applicable also to a case of adjustment for setting a panel according to the present invention in space such as a living room in which a stereoscopic video is watched or to a case of using fixed barrier positions or pitches. Such adjustment involves adjustment of the positions or pitches of fixed barriers.

Figure 24:
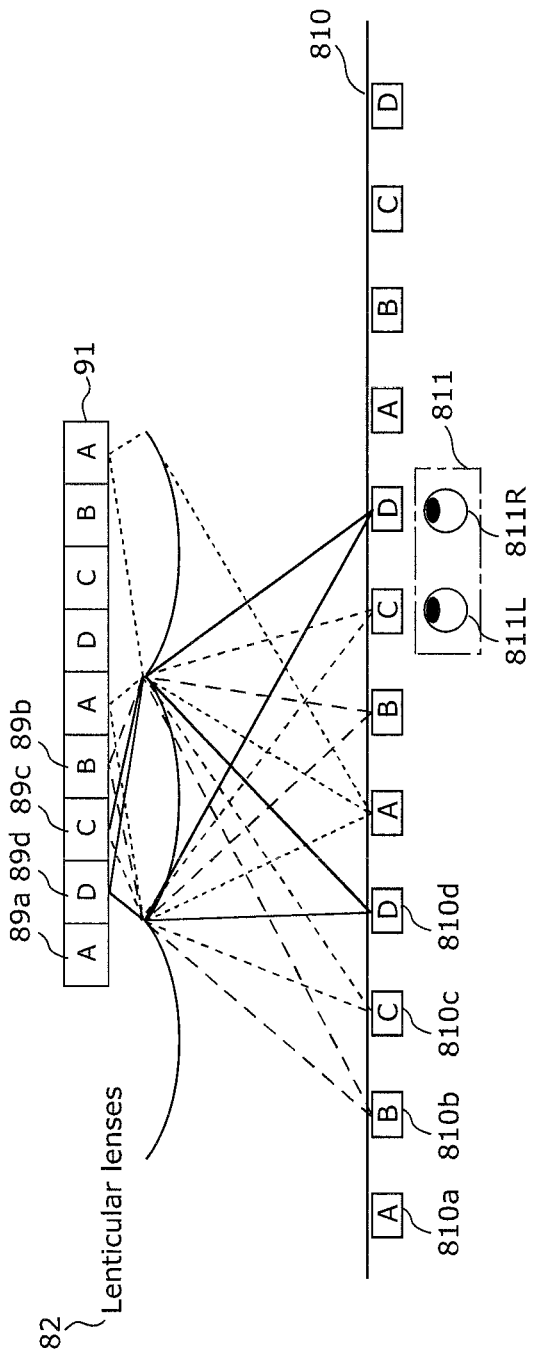
FIG. 24 is a diagram showing a barrier control structure using a lenticular board.

In the above exemplary cases, light from each of the plural pixel sequences is divided by a barrier so as to allow viewing at predetermined positions. However, the same advantageous effect is achievable by (i) selecting a lenticular board (for example, a lenticular lenses 82 in FIG. 24) including cylindrical lenses arranged thereon, as the lenticular part for displaying the respective parallax images at predetermined positions, and (ii) controlling the refraction angles of the cylindrical lenses.

In this case, the initial adjustment unit 105 performs minor adjustment of the positions of the lenses of the lenticular part or adjustment of the refractions for the respective parallax images by the lenticular part. Here, a lenticular control circuit is prepared as the barrier control circuit 106, and a lenticular part is prepared as the barrier part 101.

It is to be noted that the present invention can not only be implemented as an apparatus, a system, an integrated circuit etc. but also be realized as a method including the steps corresponding to the unique processing units of the apparatus and/or the like, and be implemented or realized as a program causing a computer to execute these steps, a recording medium such as a computer-readable recording medium including the program recorded thereon, information, data, and/or signals representing the program, and other implementations. Naturally, these program, information, data, and/or signals may be distributed via a communication network such as the Internet.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

According to this technique of the present invention, it is possible to provide a stereoscopic video display apparatus which enables a viewer to watch a stereoscopic video without causing pseudo stereoscopy even when three or more viewers simultaneously watch the stereoscopic video.

Furthermore, it is possible to reduce occurrence of pseudo stereoscopy and reduce the size of the crosstalk area by performing an optional technique of subdividing each of position intervals for parallax images having a parallax such that the position interval is smaller than a corresponding inter-eye distance in combination with the essential technique of the present invention. Furthermore, the present invention produces an advantageous effect of eliminating the need to separately prepare a number of parallax images required according to the number of viewers with respect to the maximum number of viewers when the essential technique of the present invention is combined with an optional technique of generating a required number of parallax images by interpolation using a set of a left-eye image and a right-eye image having a parallax therebetween.

What is claimed is:

1. A stereoscopic video display apparatus which displays a set of parallax images captured at multiple viewpoints and having a parallax from a reference parallax image and thereby enables a plurality of viewers to simultaneously watch a stereoscopic video generated from the set of parallax images without wearing any special glasses, said stereoscopic video display apparatus comprising:

a two-dimensional display unit configured to select, for each of the parallax images, at least one pixel sequence from pixel sequences of the parallax image, and display the parallax image using the at least one pixel sequence;

a dividing unit configured to divide light from the pixel sequences for the respective parallax images such that the respective parallax images are displayed at predetermined display positions;

a position detecting unit configured to detect a position of each of the viewers watching the stereoscopic video; and a parallax image arrangement control unit configured to (i) specify, for each of the viewers at the detected positions, a display position from among the predetermined display positions other than a display position for a right eye of the viewer, and (ii) control display of the respective parallax images so that said two-dimensional display unit displays a starting parallax image having a lowest parallax image number among the parallax images, at the specified display position, wherein the parallax images produce pseudo stereoscopy when a parallax image number of a parallax image which enters the right eye of at least one of the viewers is smaller than a parallax image number of a parallax image which enters a left eye of the viewer.

2. The stereoscopic video display apparatus according to claim 1,
wherein the number of the parallax images is a number that satisfies "the number of the viewers+1".

3. The stereoscopic video display apparatus according to claim 1, further comprising
a display position interval control unit configured to divide a position interval between the predetermined display positions at which the respective parallax images in the set are displayed,
wherein said parallax image arrangement control unit is configured to control display of the respective parallax images using the number of position interval segments resulting from the division by said display interval control unit according to the detected display positions, the number of parallax images being a value obtained according to "the number of viewers × the number of position interval segments +1".

4. The stereoscopic video display apparatus according to claim 1, further comprising
a parallax image generating unit configured to selectively perform interpolation and extrapolation of two of the set of parallax images captured at the multiple viewpoints to generate the set of parallax images other than the two parallax images, the two parallax images being a right-eye image and a left-eye image.

5. The stereoscopic video display apparatus according to claim 1,
wherein said dividing unit is a barrier part which serves as a barrier to allow the respective parallax images to be displayed at the predetermined display positions.

6. The stereoscopic video display apparatus according to claim 1,
wherein said dividing unit is a lenticular part which allows the respective parallax images to be displayed at the predetermined display positions by controlling refraction angles of cylindrical lenses placed on a lenticular board.

7. The stereoscopic video display apparatus according to claim 6,
wherein said cylindrical lenses are liquid crystal lenses.

8. The stereoscopic video display apparatus according to claim 1,
wherein the number of the viewers is larger than or equal to 3.

9. The stereoscopic video display apparatus according to claim 1,
wherein said stereoscopic video display apparatus is a television apparatus.

10. The stereoscopic video display apparatus according to claim 1,
wherein said position detecting unit is configured to detect the number of the viewers,
the number of the parallax images is a first number when a first number of viewers is detected, and is a second number different from the first number when a second number of viewers is detected, and
said dividing unit is configured to display the first number of parallax images at the first number of predetermined display positions when the first number of viewers is detected, and display the second number of parallax images at the second number of predetermined display positions when the second number of viewers is detected.

11. A stereoscopic video display method of displaying a set of parallax images captured at multiple viewpoints and having a parallax from a reference parallax image and thereby enabling a plurality of viewers to simultaneously watch a stereoscopic video generated from the set of parallax images without wearing any special glasses, said stereoscopic video display method comprising:
selecting, for each of the parallax images, at least one pixel sequence from pixel sequences of the parallax image, and displaying the parallax image using the at least one pixel sequence;
dividing light from the pixel sequences for the respective parallax images such that the respective parallax images are displayed at predetermined display positions;
detecting a position of each of the viewers watching the stereoscopic video; and
(i) specifying, for each of the viewers at the detected positions, a display position from among the predetermined display positions other than a display position for a right eye of the viewer, and (ii) controlling display of the respective parallax images so that a starting parallax image having a lowest parallax image number among the parallax images is displayed at the specified display position,
wherein the parallax images produce pseudo stereoscopy when a parallax image number of a parallax image which enters the right eye of at least one of the viewers is smaller than a parallax image number of a parallax image which enters a left eye of the viewer.

* * * * *